(12) United States Patent
Hyypio

(10) Patent No.: US 6,170,974 B1
(45) Date of Patent: Jan. 9, 2001

(54) DYNAMOELECTRIC MACHINE WITH DISTRIBUTION OF THE WINDING COILS FOR MINIMIZING VOLTAGE STRESSES AND METHOD OF LOCATING COIL LOCATIONS THEREFORE

(75) Inventor: David B. Hyypio, Rothschild, WI (US)

(73) Assignee: Marathon Electric Manufacturing Corporation, Wausau, WI (US)

(*) Notice: Under 35 U.S.C. 154(b), the term of this patent shall be extended for 0 days.

(21) Appl. No.: 08/819,956

(22) Filed: Mar. 18, 1997

(51) Int. Cl.⁷ ............................ G01R 31/06; G06F 17/18; G06F 17/50
(52) U.S. Cl. ..................... 364/488; 324/546; 310/184; 310/179
(58) Field of Search .................. 364/488, 489, 364/578, 474.12; 318/122, 123, 124, 704, 780, 772; 427/104; 324/546, 522; 310/184, 179

(56) References Cited

U.S. PATENT DOCUMENTS

| | | | |
|---|---|---|---|
| 4,075,543 | * 2/1978 | Uyen | 318/224 R |
| 4,426,771 | * 1/1984 | Wang et al. | 29/596 |
| 4,737,701 | * 4/1988 | Hoemann et al. | 318/772 |
| 4,779,812 | * 10/1988 | Fisher et al. | 242/7.07 |
| 5,050,605 | * 9/1991 | Eydelman et al. | 128/653 OSC |
| 5,111,149 | * 5/1992 | Lebesch | 324/546 |
| 5,500,582 | * 3/1996 | Owen | 318/771 |
| 5,740,600 | * 4/1998 | Rasberry | 29/596 |

OTHER PUBLICATIONS

Johnson et al. ("Electrical stress analysis model of stator coli cross–section", Conference Record of the 1996 IEEE International Symposium on Electrical Insulation, Jun. 16, 1996, vol. 1, pp. 222–225).*

Li et al. ("RF coil optimization: evaluation of B/sub 1/field homogeneity using field histograms and finite element calculations", Magnetic Resonance Imaging, vol. 12, No. 7, pp. 1079–1087, Jan. 1, 1994).*

Oraee et al. ("Interturn voltage stress in electrical machine windings due to fast switching", IEEE, 1984 Annual Report of the Conference on Electrical Insulation and Dielectric Phenomena, Oct. 21, 1984, pp. 561–566).*

* cited by examiner

Primary Examiner—Kevin J. Teska
Assistant Examiner—Phallaka Kik
(74) Attorney, Agent, or Firm—Andrus, Sceales, Starke & Sawall

(57) ABSTRACT

A method and apparatus for selecting one of a plurality of available winding configurations for a multi-phase motor is disclosed. The winding includes separate phase windings, each of which consist of a plurality of series-connected coils distributed throughout stator core slots and having overlapping end turns and/or having shared slots containing coil sides of different coils. For each configuration, a value is assigned to each coil based on its potential with respect to the applied AC voltage. A logic table of the relative voltage potential values within the end turns and shared slots is created for all phases. The interface voltage for the overlapping end turns and/or shared slots is determined for each coil side in relation to all other coils of the same phase and the other phases for establishing a record and table of the voltage stress values throughout all interfaces in the end-turns and/or slots. A map of such interface end turn and/or shared slot voltage potentials provides a map of the voltage stresses and the distribution of the voltage stresses within the winding. The best configuration can be selected applying predetermined voltage stress criteria. The analysis and selection can be carried out manually or with suitable logic apparatus. A computerized system is disclosed.

33 Claims, 15 Drawing Sheets

Slots:
1 2 3 4 5 6 7 8 9 10 11 12 13 14 15 16 17 18 19 20 21 22 23 24 25 26 27 28 29 30 31 32 33 34 35 36

Case A:

Case B:

Case C:

Case D:

Case E:

Slots:
1 2 3 4 5 6 7 8 9 10 11 12 13 14 15 16 17 18 19 20 21 22 23 24 25 26 27 28 29 30 31 32 33 34 35 36

DYNAMOELECTRIC MACHINE WITH DISTRIBUTION OF THE WINDING COILS FOR MINIMIZING VOLTAGE STRESSES AND METHOD OF LOCATING COIL LOCATIONS THEREFORE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to dynamoelectric machines with distribution of the winding coils for minimizing voltage stresses and the method of locating minimal voltage stress locations.

Various rotating dynamoelectric machines, including alternators and motors, include a power winding forming a part of a stator assembly. The power winding includes a plurality of circumferentially distributed winding coils located within circumferentially distributed winding slots of the annular stator core. In multiple phase machines, the individual phase winding coils are circumferentially displaced relative of all other phase windings. In turn, each individual phase winding will consist of a plurality of coils which are circumferentially distributed within the slots for that phase. Thus, the sides of the individuals coils are generally located in particular slots. However, the coil end turns of the several phase windings project from the opposite ends of the stator core and are consequently located in overlapped and generally engaging relationship. Because of the voltage differences in the windings, special insulation must be interposed between the coils of different phases to electrically isolate the coils belonging to different phases and prevent arcing and shorting of the windings. Traditionally, phase separators, which are also known as phase papers, are interposed between the coils of different phases and particularly of opposite polarity to establish a high level of electrical insulation therebetween. Proper initial locations of the phase insulating separators and maintaining such proper location is required and necessary to achieve and maintain a high level of electrical isolation. A similar situation may exist within the stator slots when multiple layer windings are employed and where the slots are shared by coil sides of significantly different voltage potentials. In this case, slot cell separators are interposed between coils of differing potential. As with phase insulating separators in the coil end turns, the slot cell separators must be installed with skill and care to ensure that stray conductors of a given coil do not breach the separator and make physical contact with the other coil occupying the same slot. Production testing, generally including surge testing and corona testing, is used to determine if the winding insulation does or does not meet predetermined minimum test criteria.

The end turn and intraslot regions of the coils include maximum voltage stress areas. Thus, the actual stress within the end turn and intraslot regions will vary from coil to coil depending upon the voltage differences.

It is well recognized that in addition to being subjected to normal sinusoidal potential stresses arising from the normal voltages within the windings, the end turn and intraslot regions are often subject to abnormal voltage transients, such as lightning strikes and circuit breaker closures. Further, in systems, and particularly motor systems which are connected to and powered from non-sinusoidal supplies, such as pulse width modulated inverters, the end turn and intraslot regions of the coils are further subjected to rather severe stresses due to the inherent transient and non-uniform distribution of voltage within the windings and coils from such supplies. The severity of the non-uniform voltage distribution is a function of the shape of the impinging waveform and the high frequency equivalent circuit parameters of any particular winding.

Repetition rate, or frequency, of such non-uniform voltage distributions is a highly significant, if not a critical factor, in determining the useful life of the particular insulation system within the end turns of the winding. Although the frequency of non-uniform voltage distributions resulting from events such as lightning strikes will generally be on the order of once per year or less, the frequency of such non-uniform voltage distribution may readily be 10,000 Hertz (Hz) or greater with a pulse width modulating inverter supply.

The multi-phase winding of dynamoelectric machines is known to permit some variation in the coil placement for any given phase winding. Thus, the coil windings are not specifically limited to very specific coil slots but rather some limited variation in slot location can be made as well as some variation in the connection of each multi-phase winding to a power supply or the like. Thus, of the plurality of related coils in the given phase which produce an identical polarity and resulting magnetic field, either one of the multiple coils may be chosen for positioning within particular coil slots. Applicant has recognized that by giving due consideration to placement of the coils within and of particular phases and the interconnection to the power supply terminals, the end turn and intraslot voltage stresses created may be of significantly different levels, and further can be determined and an appropriate selection made by appropriate analysis of the different coil physical distributions and electrical connections. To the inventor's knowledge, however, the prior art has not given any programmed consideration in the design of the winding placement which involves the coil slot placement relative to the magnitude of the resulting voltage stresses and has relied on establishing proper insulation separators between adjacent coils of sufficient characteristic to pass the various voltage tests.

BRIEF SUMMARY OF THE INVENTION

The present inventor has developed an analysis for any particular multi-phase winding to permit selection of a more optimal or desired coil arrangement and lead designation or assignment for the winding to permit selection of a particular voltage stress state within the end turn and intraslot regions, and particularly permitting selection of a minimum winding voltage stress therein. This minimizing of a maximum voltage stress is highly desirable and promotes the increased reliability and life of the insulation system and therefore the dynamoelectric machine.

Generally, in accordance with the teaching of the present invention, the phase winding coil distribution or configuration is analyzed to determined the allowable flexibility permitted for the location and connection of the coils while maintaining the identical magnetic arrangement and performance of the dynamoelectric machine winding. At least two different coil configurations will be analyzed to compare the particulars of the voltage stresses within the end turn regions. For each coil configuration and connection selected, a reference value is assigned to each coil based on its potential with respect to the alternating current (AC) voltage in the winding. Thus, the coil in any given phase has varying potentials therein as a result of its location in the circuit and particularly the voltage across the phase. A map of the coil-to-coil voltage stresses related to the physical slot layout of the phase winding is made for each of the selected coil distributions. The map for the different coil distribution selected are compared to each other; thereby presenting the different voltage stress conditions and permitting the selection of the desired arrangement of the coils and particularly the physical locations and the interrelated interconnections to achieve the desired lowest or best voltage stress conditions for a particular dynamoelectric machine. Those skilled in the art will recognize that the system of coil slot availability for a given motor or alternator, for example, will also generally have to consider some constraints which are established by the design and production processes for practical construction and sale of a dynamoelectric machine.

For example, in a particular three phase motor having three phase windings interconnected to each other in a "wye" connection, the stator core is provided with thirty-six slots, with six coils per phase and distributed to form the four magnetic poles for each of the three individual phase windings. Each six coils are physically arranged to produce two pairs of opposite polarity poles with distribution within twelve slots of the stator core. Thus, the eighteen coils of the three phase windings are equicircumferentially distributed within the thirtysix slots and with the several sections or sets of each phase winding resulting in a twelve lead winding, with each phase winding connected to the AC voltage in either a "high" voltage connection or a "low" voltage connection. Generally, the six coils of each phase are divided into first and second connected sets of three coils each, which are connected in series for a high voltage connection and in parallel for a low voltage connection. For purposes of analysis, the winding arrangement to establish a "high" voltage connection is used because it establishes the highest end turn voltage stresses. A parallel connection of the first and second sections of each phase provides for a low voltage connection. A low voltage system, however, inherently produces a lesser voltage stress condition than the high voltage connection. Thus, proper designing of coil placement for the high voltage connection inherently produces a minimum voltage stress condition.

In the above examples of a three phase motor, with the six coils per phase, the coil connected directly to the highest voltage terminal has a highest potential with respect to the common or "wye-connected" winding neutral and is assigned a high reference number or value; for example, a value of six. The coil in the phase winding connected to the neutral or common terminal would have the lowest potential with respect to this system and would carry a low reference number or value; for example, a value of one. The other coils between the highest and lowest potential coils would be provided with corresponding intermediate values between one and six. The assigned values establish a record and table of the relative voltage potentials of each coil in each phase and each of the coils relative to each other. From this record, a map of the voltage stress state in the end turn region is presented, with maximum and minimum stress conditions for each possible or selected pattern or arrangement resulting. A comparison of these maps readily establish the information for selection of an appropriate coil pattern or arrangement with an acceptable voltage stress, and particularly a minimum voltage stress condition where necessary or desired.

In summary, the phases or the phase windings, as such, cannot be interchanged even though it might appear to lessen the end turn or intraslot stress condition. However, the location of the coils within any given phase can be physically changed, within certain constraints required by maintaining the proper magnetic condition and also by the winding parameters and the flexibility of the practical insertion process. Therefore, in the voltage stress analysis, the flexibility of the coil placement must be predetermined and the relative voltage potential of each coil in each winding established for the various placement.

The result of the invention therefore is a method of predetermining and producing a multiple phase winding with maximum insulation protection as a result of minimizing the voltage stress applied to the interposed insulating separators. The final result, of course, is a more reliable and long life dynamoelectric machine.

BRIEF DESCRIPTION OF THE SEVERAL VIEWS OF THE DRAWING

The drawings furnished herewith illustrate a preferred process and construction based on the teaching of the present invention in which the above advantages and features are clearly disclosed as well as others which will be readily understood from the following description of the illustrated embodiment.

In the drawings.

DESCRIPTION OF THE ILLUSTRATED EMBODIMENT

Figure 1:
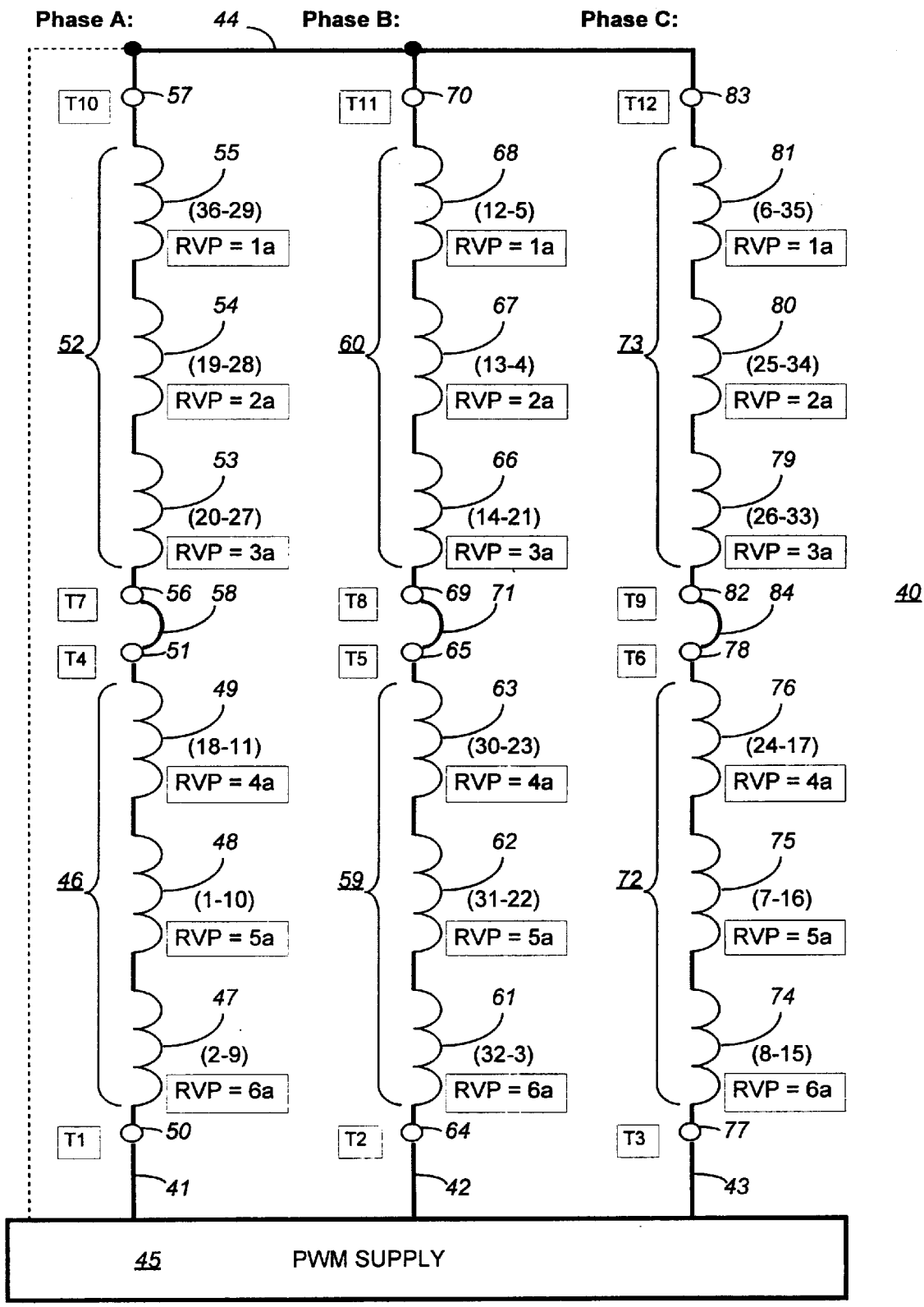
FIG. 1 is a typical schematic circuit of a motor having a three phase winding of a motor and connected in a high voltage circuit connection and particularly a wye connection.

Referring to the drawings and particularly to FIG. 1, a three phase stator winding 40 is illustrated connected to an alternating current supply. The stator winding 40 is shown for a typical four pole, three phase motor. The illustrated winding 40 is shown in a well known wye connection, including three supply terminals 41, 42 and 43. A common or neutral terminal 44 optionally interconnects the common, or neutral, of the three windings to the pulse width modulator supply 45 to complete the circuit connection. A pulse width modulator inverter supply (PWM) 45 is shown connected to the terminals 41–43 to energize the stator winding 40 for purposes of illustration. Any other supply can of course be provided.

The wye system has three similar winding legs defining the three phases normally referenced as shown as phase A, phase B and phase C. Each phase in the illustrated embodiment of the invention is identically constructed consisting of six coils. Referring to phase A, the six coils are arranged in a first set 46 of three coils, 47, 48 and 49, which are connected in series with each other between a first terminal 50 and a second terminal 51. An essentially identical second set 52 of three coils 53, 54 and 55; which again are connected in series with each other between third and fourth terminals 56 and 57, respectively. In FIG. 1, the first coil set 46 and the second coil set 52 are shown connected in series with the terminal 50 of the first set 46 connected to the supply terminal 41. The opposite end terminal 51 of set, 46 is connected by an interconnecting means 58 to the terminal 56 of the second set 52. The second terminal 57 of the second set 52 is connected to the common or neutral power terminal 44. The connection of all three phase windings in series establishes the high voltage and maximum voltage input for the motor. Each coil of phase A winding is therefore subjected to a corresponding potential of the supply voltage with the voltage divided equally across the six coils. Because the first set 46 and the second set 52 of the coils are the same, they can be interchanged in the connection between the supply terminal and the common or neutral terminal 44 without changing the input voltage or other performance of the motor.

Each of the other two phases B and C is similarly constructed with two sets of coils and corresponding terminals. The coils and terminals of phases B and C are similarly interconnected to the power supply. For purposes of subsequent description in the coil arrangement and the stress analysis, separate identifying numbers are assigned to the other two phases B and C, as shown in FIG. 1.

Figure 2:
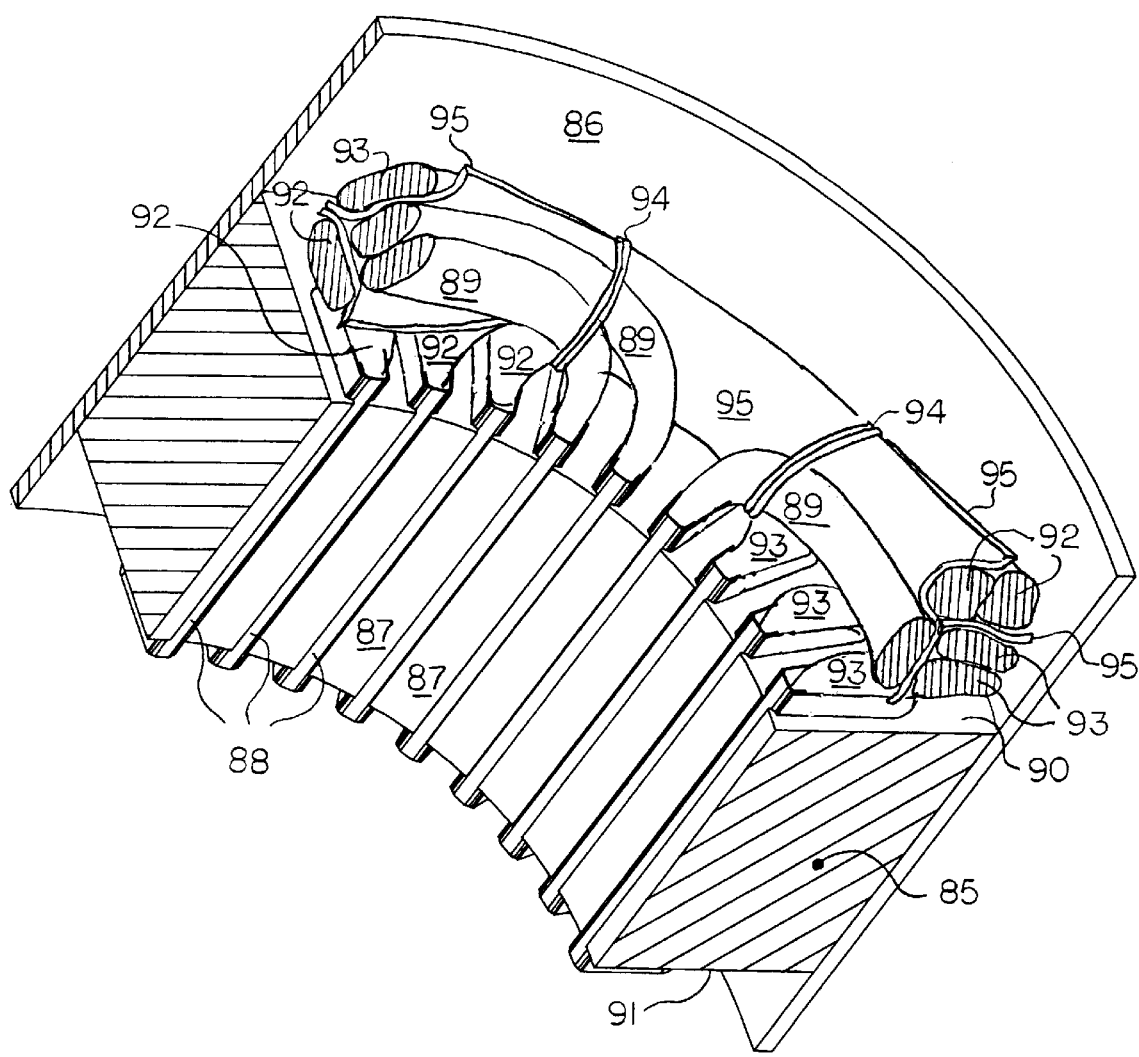
FIG. 2 is a diagrammatic illustration of a portion of a stator for a three phase motor illustrating the end turn construction.

Referring particularly to FIG. 2, a fragmentary portion of a stator for a three phase AC motor is illustrated. The stator includes an annular core 85 mounted within a fixed supporting frame 86. The inner face 87 of the annular core 85 is formed with a plurality of circumferentially spaced slots 88 within which winding 40 is wound. In actual practice, the coils are prewound and inserted into preselected slots. In the three phase winding, the three separate phase windings are located within the spaced slots 88. Each phase winding includes the plurality of its coils with the sides of the coils distributed throughout the spaced slots 88 assigned to that particular phase. Thus, a first phase such as phase A is inserted into preassigned slots with the end turns 93 and 93' projecting from the opposite end faces 90 and 91 of the core 85. The coils of the second phase B are similarly wound or located in appropriate offset slots 88 with respect to the first phase and with its end turns 92 extending over the end turn 93 of phase A. Finally, the third phase C has its coils wound or located in slots 88 offset with respect to the coils of the other two phases A and B and with its end turns 89 overlapped with the other end turns. The various end turn coils within the end turn regions are in general alignment and are secured to each other with a suitable lacing 94 in accordance with known practice. Prior to such lacing, the end turns 89, 92 and 93 are separated from each other by insulating paper or separators 95. The separators are generally of a well known and suitable construction of insulating materials having a withstand voltage characteristic in excess of any possible anticipatory voltage which will arise within the end turns. The separators 95 are thus inserted between the phase coils in the end turn region to electrically isolate the phase windings from each other. The insulation system is thus clearly designed with a sufficient voltage withstand characteristic to isolate the phase winding not only under normal conditions arising from the normal sinusoidal potential stresses due to a supply but to isolate the winding from abnormal external voltage conditions as well as the known special voltage conditions associated with PWM supply 45. Thus, the separators must withstand abnormal voltage conditions associated with lightning strikes, circuit breaker closures and the like. In addition, when the motor is energized from the pulse width modulator inverter supply 45 or the like as presently rather widely used in connection with various electric motors, the insulation must withstand the repetitive high frequency voltage transients inherent in the PWM supply as well be recognized readily by those skilled in the art. The present invention particularly provides a method of determining a maximum voltage potential difference within the end turns.

Figure 3:
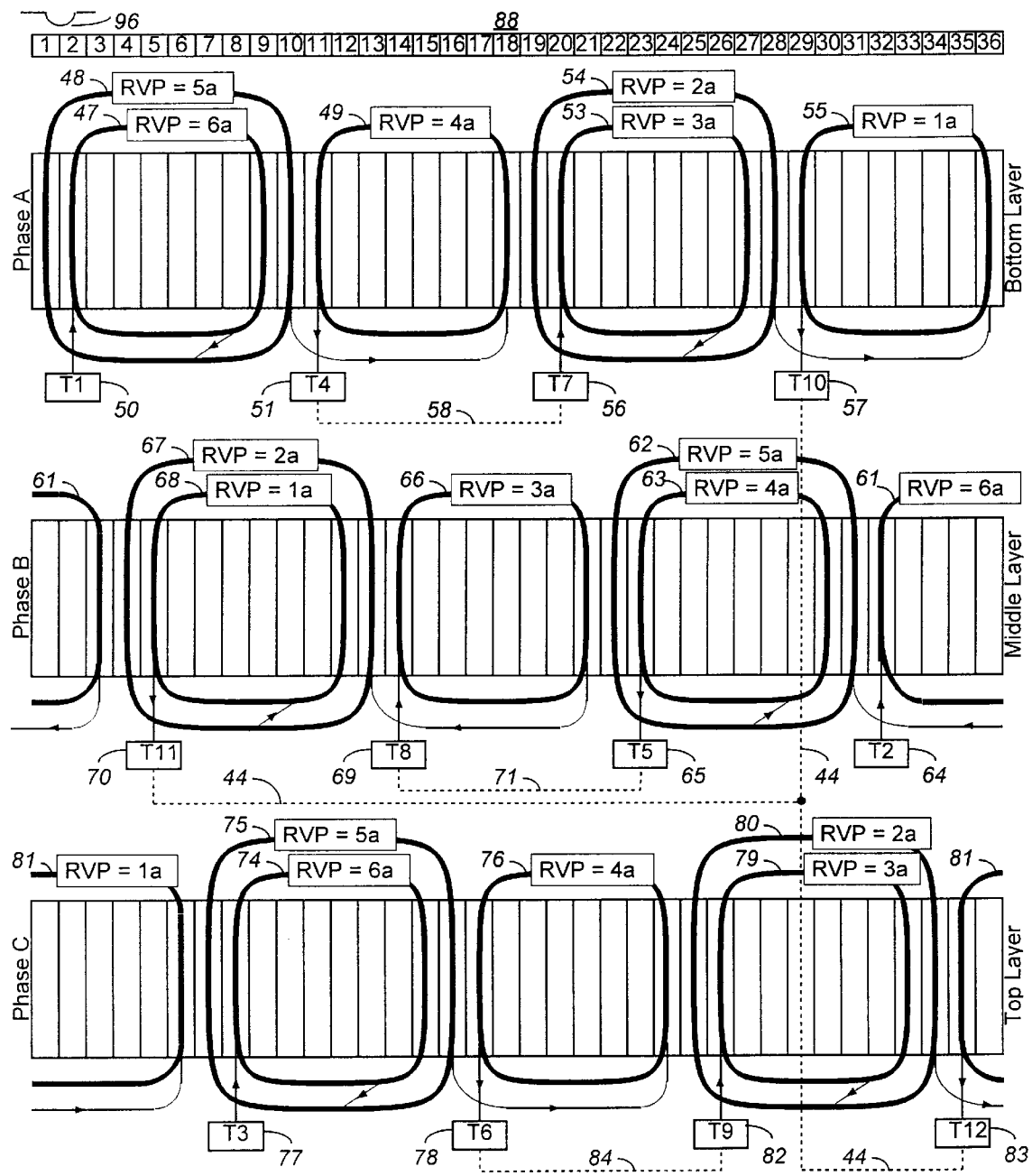
FIG. 3 is a diagrammatic illustration of one coil/slot arrangement for producing a four pole, three phase stator winding for the motor of FIGS. 1 and 2.

FIG. 3 is a schematic and linear representation of a coil/slot arrangement with the coils located within the slots 88 also shown in a linear array. In FIG. 3, the individual slots 88 are identified by the slot numbers 1–36, inclusive, for receiving of the several coils of the phase windings as shown. The phase coils of FIG. 1 are shown by single line illustration and interconnected to the supply terminals as shown in FIG. 1.

The locating notch for the slots is shown as at 96 in FIG. 3 for referencing of the slot windings. In FIG. 3, three stator slot layouts are shown respectively for phase A, phase B and phase C for purposes of clarity of illustration. Thus, each of the illustrations is in line with the other illustrations in FIG. 3 to fully explain the interrelationship between the coils and the analysis presented by the present methodology.

Referring to FIG. 3, the uppermost illustration of the stator core slots illustrates the insertion of coils 47, 48 and 49 of section or set 46 occupying slots 1, 2, 9, 10, 11 and 18 and set 47 of the other half of the winding occupying slots 19, 20, 27, 28, 29 and 36. Thus, the first set 46 are shown wound in assigned slots of slots 1–18 and the second set 52 in slots 19–36.

More particularly, coil 47 has its sides in slots 2 and 9 with the end turn projecting axially to the opposite ends of the core. Coil 48 is similarly located in slots 1 and 10 and the third coil 49 is located in slots 11 and 18, as shown in FIG. 3 and also identified in FIG. 1 by the slot numbers in parenthesis, for ease of referral. Similarly, in the figures, a conventional terminal identification is shown within terminal boxes, which are separately numbered herein. The second section or set 52 has the coil 53 wound in slots 20 and 27, coil 54 is wound in slots 19 and 28 and coil 55 is wound in slots 29 and 36 to complete the coil locations. The power supply connection are also shown in FIG. 3 as illustrated in FIG. 1, with coil 47 having its terminal 50 connected to the incoming power terminal 41. Coil 49 of set 46 is connected by interconnecting means 58 to the terminal 56 of coil 53 of the second coil set 52. The opposite end of set 52 has its terminal 57 connected to the common or neutral terminal 44.

Phase B and C are wound within other assigned slots 88 in a similar manner as shown in FIG. 3.

In accordance with methodology of the teaching of this invention and with reference to the schematic illustration of FIG. 1, values are assigned to each coil based on the coil voltage or potential of the individual coil. The common or neutral connection 44 provides the minimal voltage for each of the phase circuits. The terminals connected to the three phase power supply at terminal connections 41, 42 and 43 supply the maximum voltage potential position. The intermediate coils are at an intermediate potential. Thus, the steady-state voltage is divided substantially equally across the six coils in each phase.

Under the known conventions the power for each coil set is assumed to be inserted to produce the current flow into the one side of the coil of the two or dual coil winding in the coil set to produce a north magnetic pole and into the opposite side of the second coil winding of the set to produce a south magnetic pole. Further, the industry standard provides for certain connection of the terminals in a given phase winding. For the wye-connected three phase winding previously disclosed the standard voltage connection provides for interconnection of coil terminals identified by conventional symbols T1 through T12, as shown in FIGS. 1 and 3. Terminals T4 and T7 are connected as the common connected terminals of the phase windings within phase A in the high voltage wye connection and terminals T1 and T10 providing the respective interconnection of phase A to the power supply and to the common or neutral connection, as previously shown and described. Phases B and C have similar terminal connections, as shown in FIGS. 1 and 3.

In accordance with the teaching of the present methodology, each coil is assigned a value based on its potential position in the circuit as shown in FIGS. 1 and 3. Thus, the six coils of FIG. 1 can be respectively assigned values relative to the potential level, such as by numbers 1–6, with an added "a" to distinguish from other similar numbers, and with 1a being the lowest potential value and 6a providing a maximum potential value. The intermediate coils have similar gradations of potential. Phases B and C are similarly identified by potential numbers 1a through 6a respectively. The following table thus identifies the coils, the coil locations and the potential of the coils, as shown in FIGS. 1 and 3. The coil slot locations are shown in parenthesis in the drawing.

TABLE I

| Coil # | Slot Location | Relative Voltage Potential |
|--------|---------------|----------------------------|
| 47 | 2-9 | 6a |
| 48 | 1-10 | 5a |
| 49 | 18-11 | 4a |
| 53 | 20-27 | 3a |
| 54 | 19-29 | 2a |
| 55 | 36-29 | 1a |
| 61 | 32-3 | 6a |
| 62 | 31-22 | 5a |
| 63 | 23-30 | 4a |
| 66 | 14-21 | 3a |
| 67 | 13-4 | 2a |
| 68 | 12-5 | 1a |
| 74 | 8-15 | 6a |
| 75 | 7-16 | 5a |
| 76 | 24-17 | 4a |
| 79 | 26-33 | 3a |
| 80 | 25-34 | 2a |
| 81 | 6-35 | 1a |

In the following description, it is assumed that the winding is a three-layer concentric coil winding, well-known to those skilled in the art. Phase A comprises the first layer and with the end turns 93 projecting outwardly from the opposite end faces of the core and forming in outermost layer of the coil in the end turn region. Phase B coils comprise the middle layer and thus provides the winding with its end turns 92 closely adjacent to the end turns 93 of winding A. The phase C coils comprise the top layer, or layers closest to the stator bore inner diameter, with the end turns 89 extended out in the overlapping engagement with the end turns of coils A and B. Thus, the potential between the phase coils A and B, B and C and A and C are to be analyzed to determine the particular voltage stresses within the end turns 89, 92 and 93 in the end turn regions. This is made by a slot-by-slot analysis to determine the total distribution of the voltage stresses within the end turn regions. The result is a slot-based display of the end turn stress locations, which for FIGS. 1 and 3 is shown in the following Table II.

TABLE II

Relative Voltage Potential Map of Endturn Region

| | Slot | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Bottom-Middle Coils | 11 | ▓ | ▓ | 8 | 8 | 8 | 8 | 8 | 8 | 7 | ▓ | ▓ | <u>6</u> | 7 | 7 | 7 | 7 | 7 |
| Middle-Top Coils | 7 | 7 | 7 | 3 | ▓ | ▓ | 7 | 8 | 8 | 8 | 8 | 8 | 8 | ▓ | ▓ | 8 | 7 | 7 |
| Bottom-Top Coils | 6 | 7 | 7 | 7 | 7 | 7 | 11 | ▓ | ▓ | 11 | 10 | 10 | 10 | 10 | 10 | 8 | ▓ | ▓ |

| | Slot | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| Bottom-Middle Coils | 5 | ▓ | ▓ | 8 | 7 | 7 | 7 | 7 | 7 | 6 | ▓ | ▓ | 6 | 7 | 7 | 7 | 7 | 7 |
| Middle-Top Coils | 7 | 7 | 7 | 9 | ▓ | ▓ | 6 | 7 | 7 | 7 | 7 | 7 | 8 | ▓ | ▓ | 8 | 7 | 7 |
| Bottom-Top Coils | 6 | 7 | 7 | 7 | 7 | 7 | 5 | ▓ | ▓ | 5 | 4 | 4 | 4 | 4 | 4 | 3 | ▓ | ▓ |

▓ (indicates coil transition region)

Considering phases A and B as shown in FIG. 3, in the end turn region aligned with slot 1, the coil 48 of phase A appears having an assigned value of 5. In phase B, coil 61 appears having an assigned value of 6. The total combined voltage stress value is thus assigned a value of 11 in the end turn region above slot 1, which has been entered in Table II.

Similar voltage analysis can be readily carried out for the remaining 35 slots. Thus, in the end turn region aligned with slot 2, one side of coil 47 appears having an assigned value of 6. Phase B includes the end turn of the winding 61 aligned with slot 2 and it also has an assigned value of 6. Thus, in the second slot end turn region, the phase A to B voltage stress assigned value is 12, and thus a maximum.

In slot 3, the coil 47 of phase A overlies and extends in the end turn region aligned with slot 3. Phase B has the one side of coil 61 extending from slot 3 into the end turn region aligned with slot 3 and the voltage potential has a value of 6. Thus, slot 3 again encounters a maximum voltage stress of 12 between phases A and B.

Moving to the end turn region aligned with slot 4, the phase B winding has a coil side with an assigned value of 2. Coil 47 of phase A overlaps this coil with its assigned value of 6 and produces a voltage stress assigned value between the two end turns of 8.

The same process can continue through the balance of the slots.

A similar analysis is made between the bottom and top coil layers of the middle and top coil layers, that is, phases A and C, and phases B and C.

In the end turn region aligned with slot 1, coil 61 of phase B and coil 81 of phase C are in overlapping relationship and in alignment with slot 1. Coil 61 has an assigned value of 6, coil 81 has an assigned value of 1 producing a voltage stress assigned value of 7.

Similarly, in the end turn region aligned with slot 1, the voltage values between the phases A and C produces a combination of 5 for coil 48 of phase A and of 1 for coil 81 of phase C for a total voltage stress assigned value 6.

By the comparison of the overlapping values, the voltage potential map of the end turn region shown in Table II is produced.

As disclosed in the Table II, there are certain areas of adjacent slots having like total stress values. These are areas of coil transition and generally present particular areas of concern. Transition regions are adjacent slots which are occupied by coils of opposite phase such as at slots 2 and 3, 5 and 6, 8 and 9 and so forth. The transition regions are shown in the chart by underlining of the adjacent stress values for clarity of presentation.

In concentric windings such as typical of the described motor, proper placement of the phase separators 94 in the transition regions is particularly difficult to achieve because of the irregular shape of the coil and the interface in those regions. The force exerted on the phase separator 94 introduced during the end turn forming and lacing (94a) operation tends to move the separators 94 from their intended preset locations. In such windings, a significant objective is minimizing the voltage stress in the transition regions in order to provide some compensation for any movement of the separators.

The above discussion illustrates however that the definition of an optimal selection may change for different motors, and particularly from one design to another depending upon the desired outcome. Generally, the optimum stress condition is that which minimizes values in the end turn voltage stress map overall. With a maximum level in two transition areas, a redesign and coil relocation with a significant stress reduction condition in those transition slots would generally be of controlling interest.

As discussed previously, the coil placement in most motors does permit some variations particularly with respect to moving of the locations of the coils within a given phase and the interconnection to the incoming power system.

Figure 4:
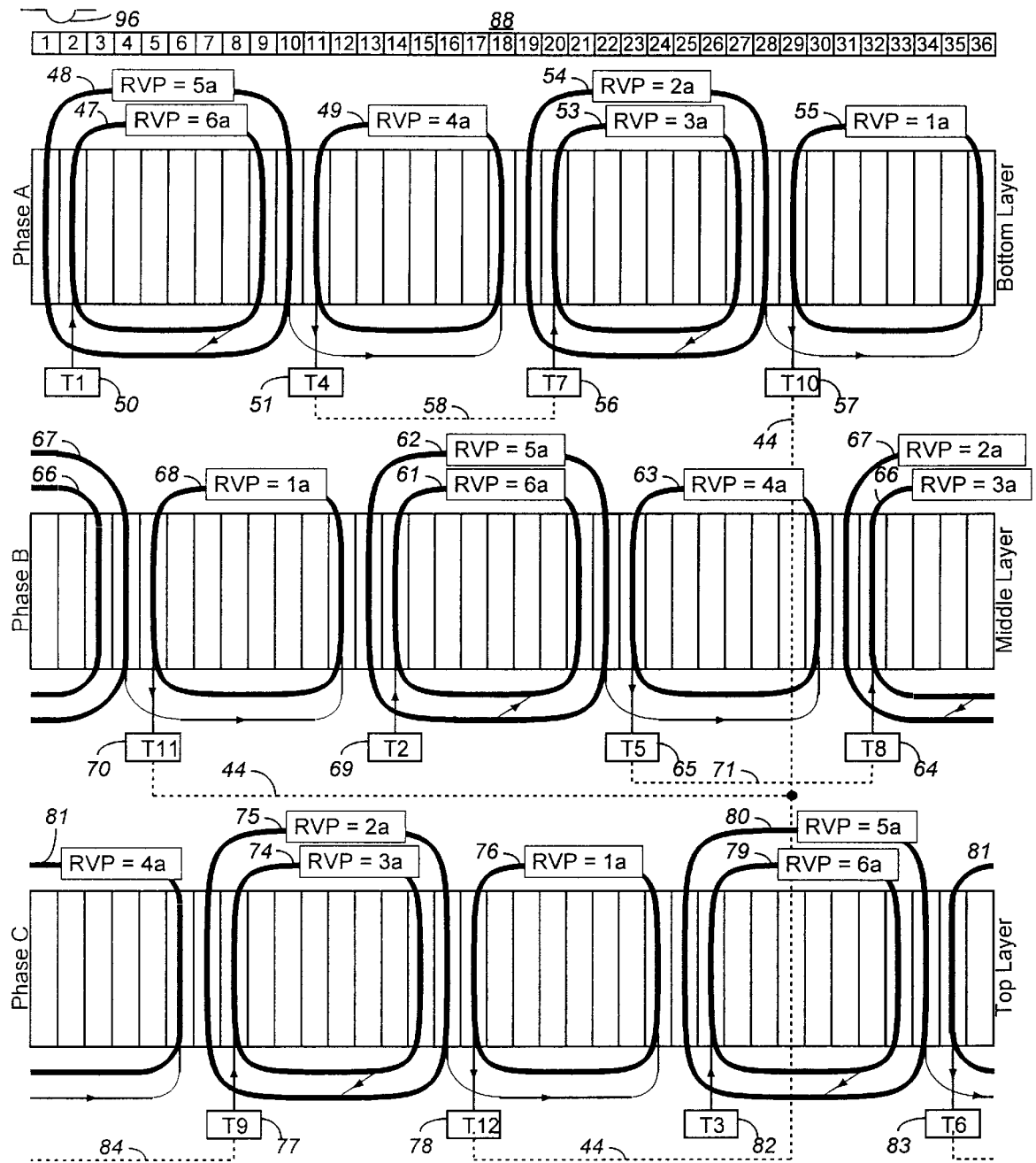
FIG. 4 is a view similar to FIG. 3 illustrating a further coil/slot arrangement for producing the same four pole, three phase motor winding but with a reduced maximum voltage stress condition in the end turn region of the motor winding.
Figure 5:
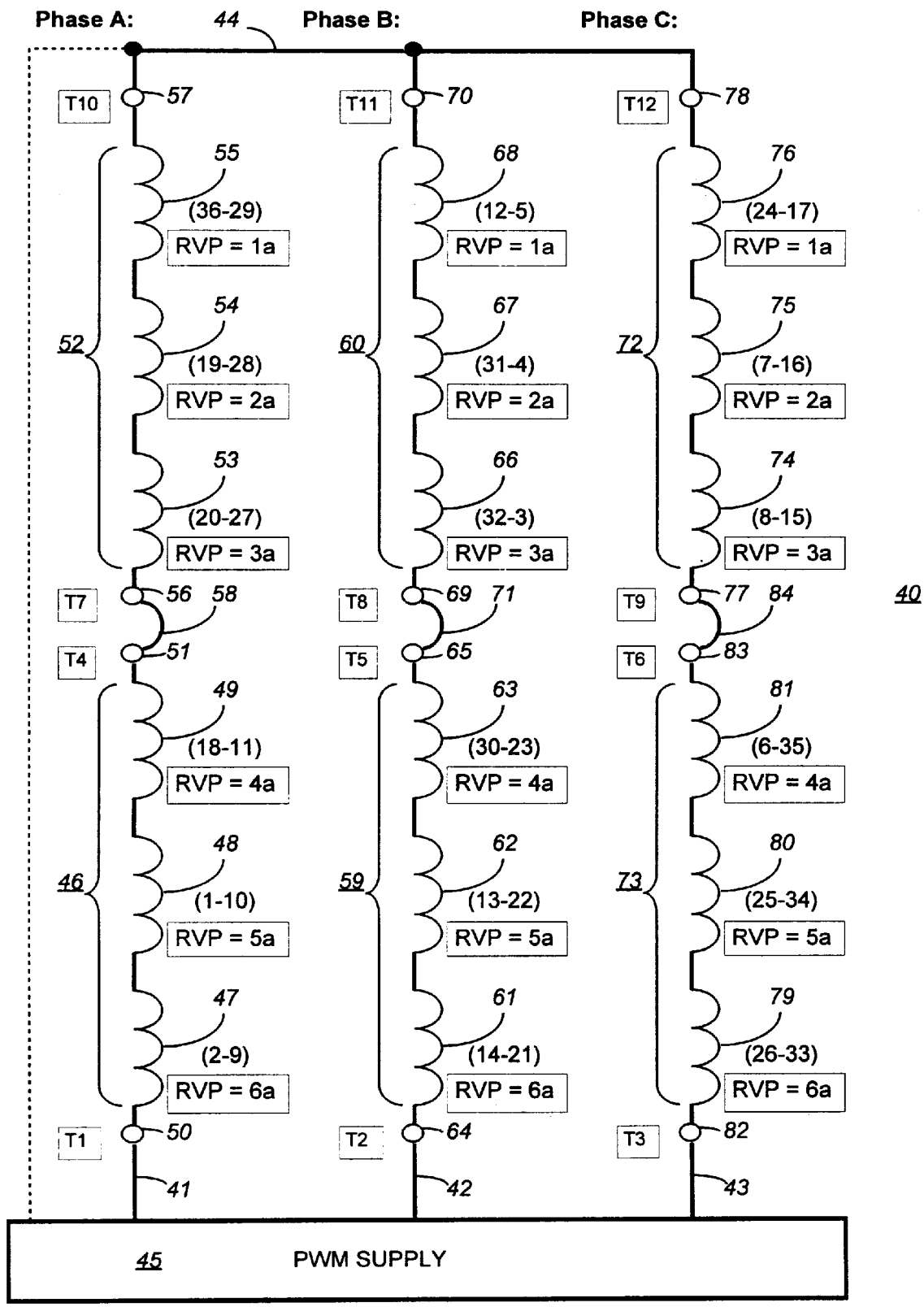
FIG. 5 is a schematic circuit of the winding shown in FIG. 4.

For example, in the schematic illustration of FIG. 1, the first and second sets can be reversed in the connection to the supply. For example, as shown in FIGS. 4 and 5, particular phase B and C are revised. In phase C, the second set 73 of the coils is interchanged with the first set 72. Thus, set 73 will have its terminal 82 connected to the input terminal 43 and its terminal 83 connected by interconnecting means 84 to terminal 77 of the first set 72. The terminal 78 of the first set 72 would be connected to the neutral terminal 44. This maintains the six coils of phase C connected in series between the power terminal 41 and the common or neutral terminal 44 of the circuit. This maintains the same magnetic field, but reverses and changes the assigned potential values of the coils from that set forth in the original Table 1. In addition, the coils of a phase B can be relocated in the slots allotted to such phase, such as shown for phase B of schematic circuit shown in FIG. 5. This again maintains six coils connected in series but changes the potential value of the several coils. The winding slot locations and connections are shown in FIG. 4. The core reference notch 96 remains in the same physical relationship with respect to the phase A.

An analysis corresponding to that made for the prior coil distribution is made with respect to the coil distribution and circuit connections as shown in FIGS. 4 and 5. The relative voltage potential of the respective coils of FIGS. 4 and 5 is set forth in the following Table III.

TABLE III

|  | Coil # | Slot Location | Relative Voltage Potential |
|---|---|---|---|
| Phase A | 47 | 2-9 | 6a |
|  | 48 | 1-10 | 5a |
|  | 49 | 18-11 | 4a |
|  | 53 | 20-27 | 3a |
|  | 54 | 19-28 | 2a |
|  | 55 | 36-29 | 1a |
| Phase B | 61 | 14-21 | 6a |
|  | 62 | 13-22 | 5a |
|  | 63 | 30-23 | 4a |
|  | 66 | 32-3 | 2a |
|  | 67 | 31-4 | 1a |
|  | 68 | 12-5 | 6a |
| Phase C | 79 | 26-33 | 6a |
|  | 80 | 25-34 | 5a |
|  | 81 | 6-35 | 4a |
|  | 74 | 8-15 | 3a |
|  | 75 | 7-16 | 2a |
|  | 76 | 24-17 | 1a |

The analysis based on the assigned relative voltage potentials creates a map of the end turn regions as set forth in the following Table IV.

TABLE IV

Relative Voltage Potential Map of Endturn Region

| | Slot | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| A–B Bottom-Middle Layer | 8 | ▓ | ▓ | 8 | 7 | 7 | 7 | 7 | 7 | 6 | ▓ | ▓ | 9 | 10 | 10 | 10 | 10 | 10 |
| B–C Middle-Top Layer | 6 | 6 | 6 | 5 | ▓ | ▓ | 3 | 8 | 4 | 4 | 4 | 4 | 8 | ▓ | ▓ | 8 | 7 | 7 |
| A–C Bottom-Top Layer | 8 | 9 | 9 | 9 | 9 | 9 | 8 | ▓ | ▓ | 8 | 7 | 7 | 7 | 7 | 7 | 6 | ▓ | ▓ |

| | Slot | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| A–B Bottom-Middle Layer | 8 | ▓ | ▓ | 8 | 7 | 7 | 7 | 7 | 7 | 6 | ▓ | ▓ | 3 | 4 | 4 | 4 | 4 | 4 |
| B–C Middle-Top Layer | 7 | 7 | 7 | 6 | ▓ | ▓ | 9 | 10 | 10 | 10 | 10 | 10 | 8 | ▓ | ▓ | 8 | 7 | 7 |
| A–C Bottom-Top Layer | 3 | 4 | 4 | 4 | 4 | 4 | 8 | ▓ | ▓ | 8 | 7 | 7 | 7 | 7 | 7 | 6 | ▓ | ▓ |

▓ indicates coil transition region

Thus, considering phases A and B in the end turn region aligned with slot 1, phase A coil 48 has an assigned value of 5a. The phase B coil 66 aligned with slot 1 has an assigned value of 3a; providing a total stress assigned value of 8. In the end turn region aligned with slot 2, coil 47 has an assigned value of 6a and the coil 66 of phase B has an assigned value of 3a producing a maximum stress assigned value of 9. The same relative coil arrangement exists in the end turn region aligned with slot 3 for phases A and B again providing a slot maximum assigned value of 9. End turn regions aligned with slots 2 and 3 thus constitute a transition region. Corresponding analysis and assignment of values results in the totals of the Table IV, with transition regions appearing not only at slots 2 and 3 but at the other slots as noted by the underlined stress values. As shown in Table IV, the maximum combined voltage stress values presented in the end turn regions is 9 including all the phase transition regions. Although none of the transition regions has a minimum voltage stress value of 3 as that shown in Table II for the prior analysis of the FIG. 3 coil distribution, one would normally make a determination on maximum stress values. As previously noted, the maximum stress values particularly in transition regions are of the primary concern. Thus, the reduction in the several maximum stress values at transition regions as shown in the map of Tables II and Table IV shows the combined value reduction of a maximum stress assigned value 12 to a maximum stress assigned value 9, or 25 percent. This is a very significant reduction and provides a substantial improvement in the voltage stress characteristic of the windings overall.

This improvement is further enhanced when the winding is subjected to transient, non-uniform voltage stress as those imposed by non-sinusoidal, switching voltage supplies such as PWM inverters.

In the overall analysis of the windings, the flexibility of the lead wire designation in a three phase dual voltage motor establishes at least two configurations per phase and therefore eight ($2^3$) combinations. The flexibility of the coil insertion process with respect to the slots further provides for the two coil configuration per phase or a second eight combination. Thus, by either manual or automated analysis, a substantial number of different combinations of the coil distributions and power connection assignments can be made and the various combinations and different winding configurations analyzed to yield a most optimal or desired solution.

Although the several different variations in coil arrangements and connections can be manually made and analyzed with or without automated devices, appropriate analysis can of course also be made using computer devices with manual or automated input of the several coil arrangements. Thus, the analysis basically is based on the rearrangement of the coils with respect to available slots and of the winding terminal designations, in combination with the assignment of some reference values to compare the voltage stresses developed in each coil. An appropriate table of information is developed, along with a map based on such tables, and therefrom selection of a desired voltage stress map is made based on known criteria.

For example, a computer might read the coil distribution as shown in a diagrammatic core and coil drawing such as shown in FIGS. 3 and 4, or the different available coil arrangements and the various terminal connections manually inserted and stored in the computer. By varying of the assigned circuit connections and the coil configurations, the available winding configurations would be available for analysis. The assigned potential value to the coils in each configuration could be readily made and produced as a relative voltage potential table for each configuration. The relative voltage potentials in the related slots could then be calculated to establish the voltage stress maps such as shown in Tables II and IV. The voltage stress table would then be analyzed. By consideration of appropriate selection criteria, the desired or optimal selection of coil distributions and connections can be determined by visual inspection or computer programmatic evaluation of the voltage stress maps.

In order to visually or to automate the process of determining a preferred or optimal low stress winding configuration, various criteria can be used. Generally, that stress distribution which includes a lower maximum stress in any location compared to all other configurations may be desirable. Other criteria however might be considered; such as, a significantly reduced overall distribution compared with a single location, or a reduction in a particular location or locations and the like. To automate the process, some form of a processing unit or computer would of course provide maximum automation. Such a system would require inputting of the basic information required including the basic allowable coil configurations for each phase, the number of terminals, the available interconnection, and selection of the number of phases. The number of coils sets with the number of coils in each set and the slot location provided to a coil configuration would also be introduced. For a three phase motor, insertion of a coil configuration for one phase would of course permit the programming of the three phases, by inserting the configuration, such as the wye-winding configuration and the terminal connections of the prior illustrations.

Figure 6:
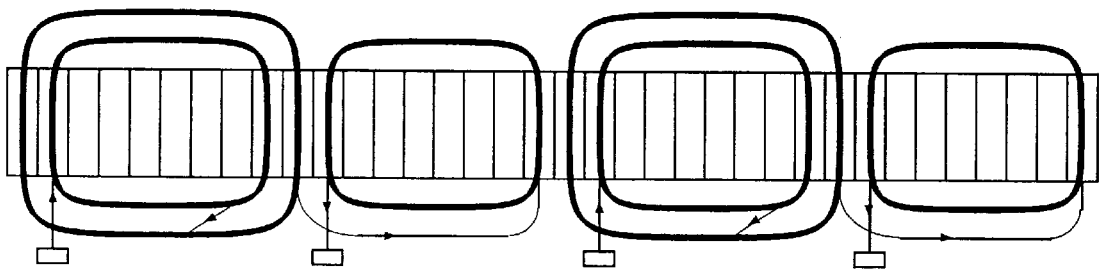
FIG. 6 illustrates available winding patterns including allowable and non-allowable patterns.
Figure 6:
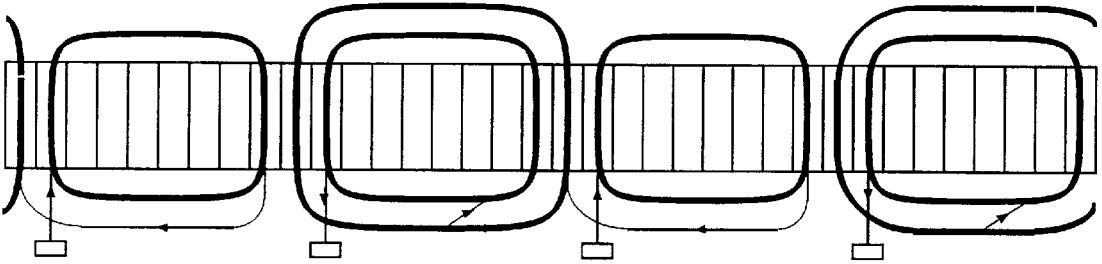
Figure 6:
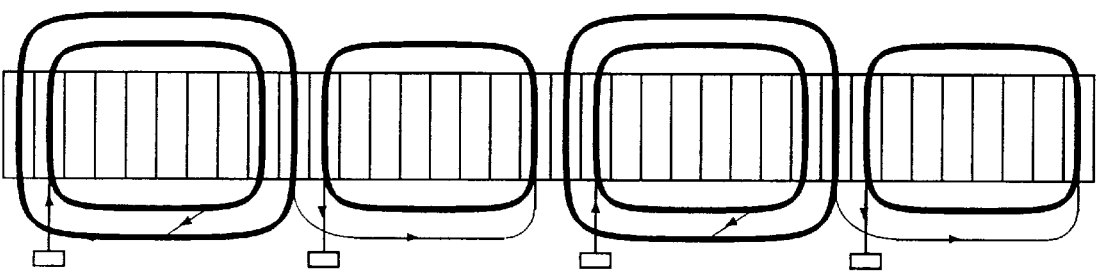
Figure 6:
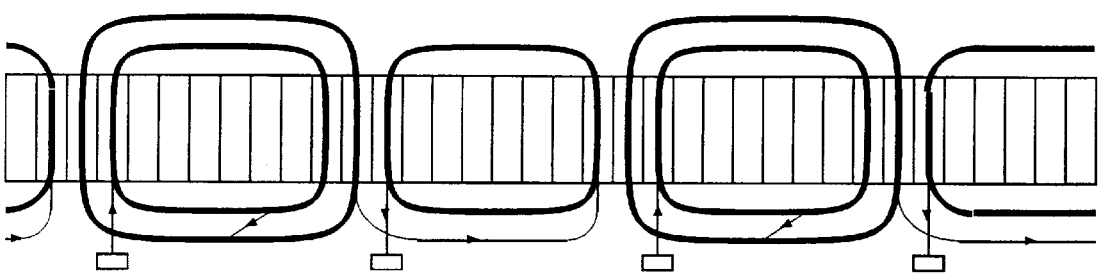
Figure 6:
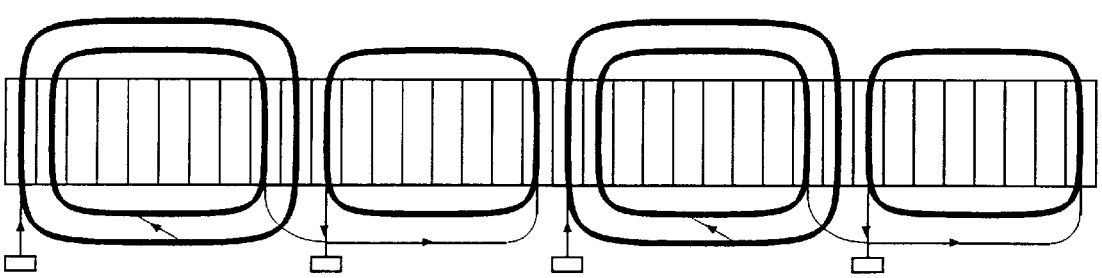
Figure 7:
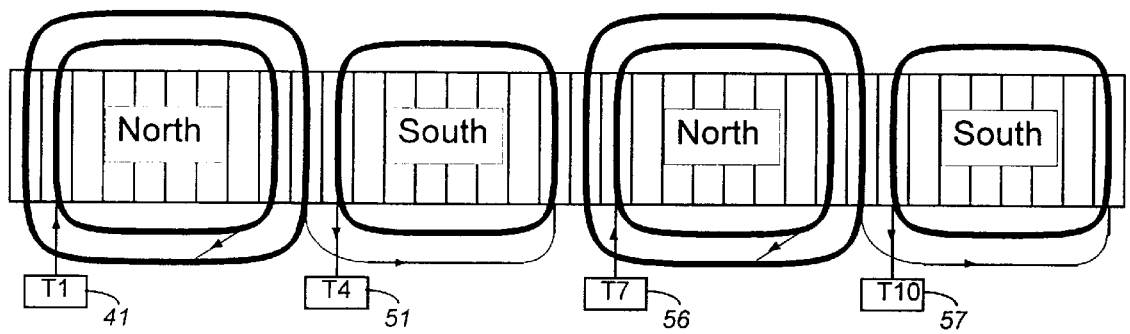
FIG. 7 illustrates allowable terminal connections for the allowable patterns shown in FIG. 6.
Figure 7:
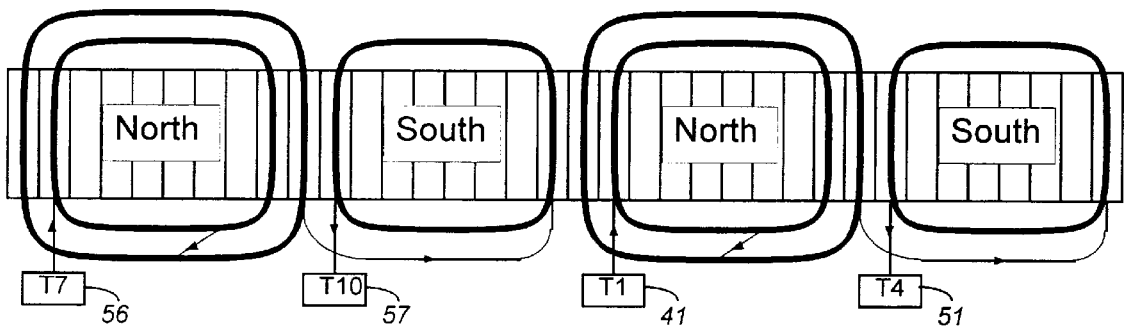
Figure 7:
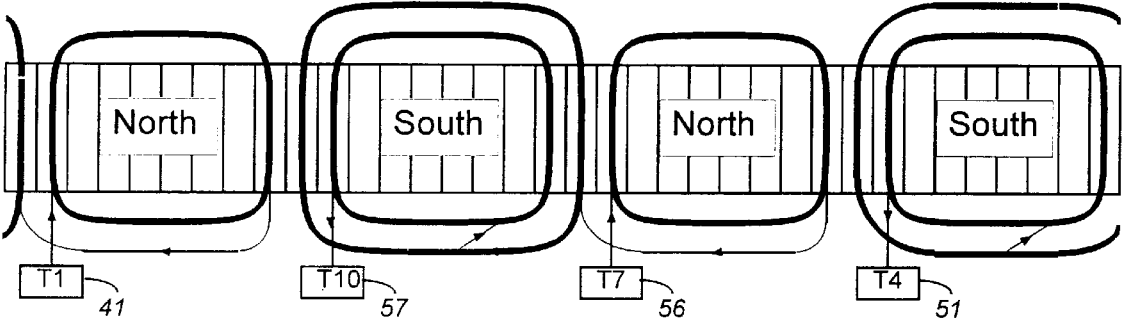
Figure 7:
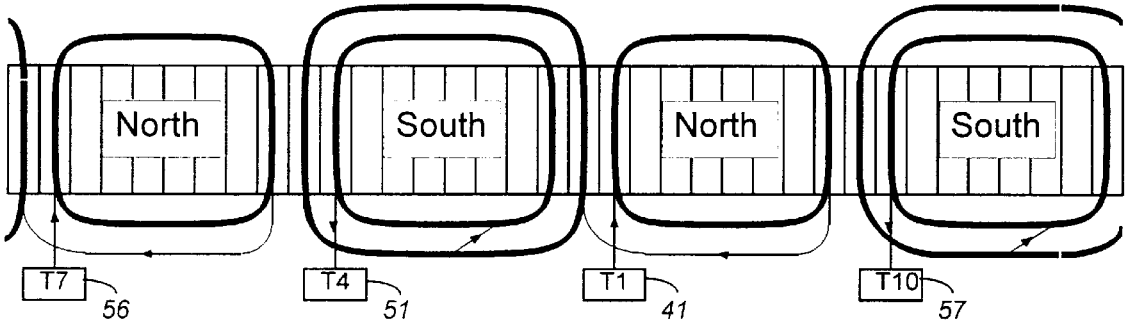
Figure 8:
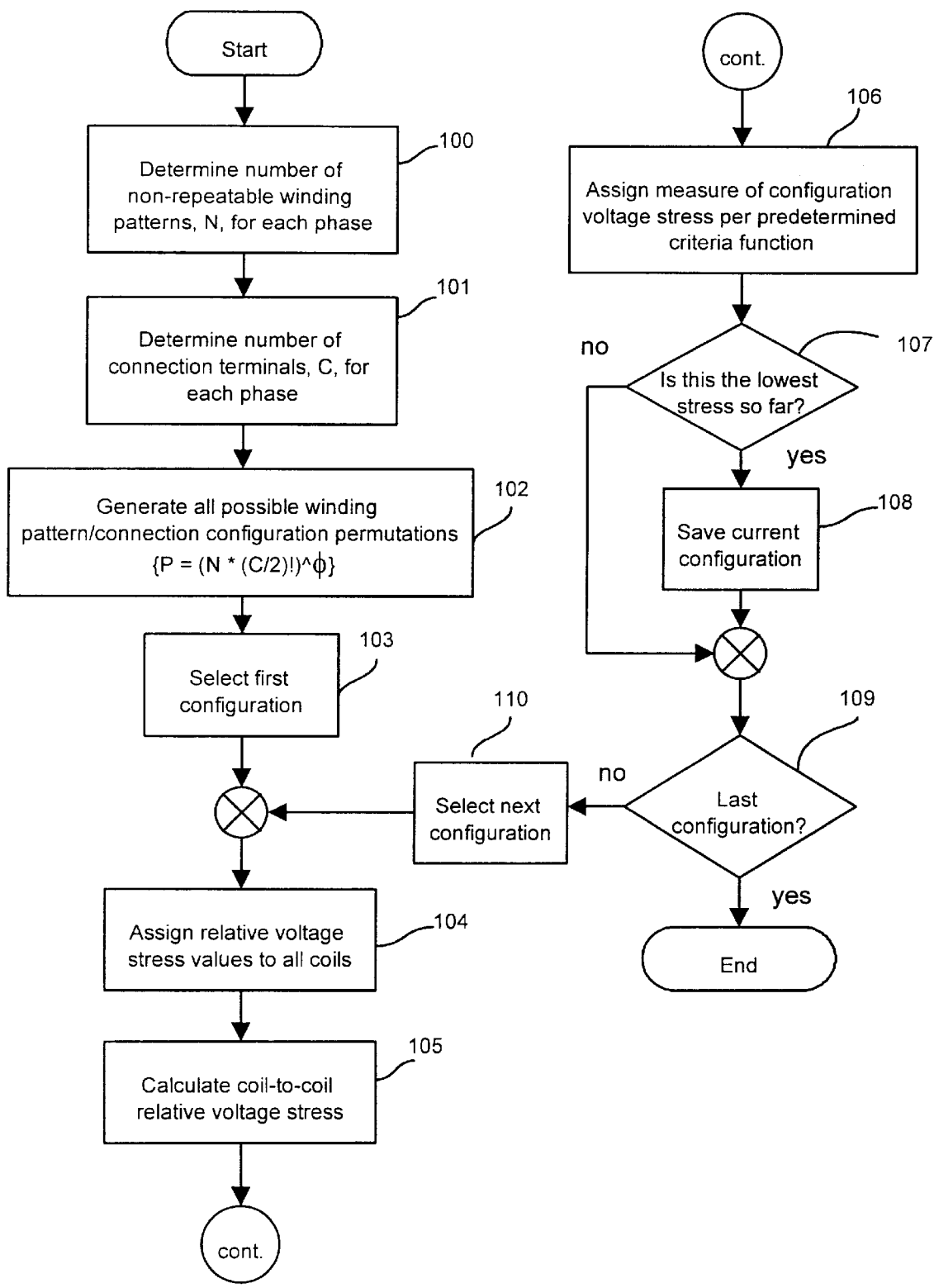
FIG. 8 illustrates one program for automated analysis of a multiple phase motor winding.

An automated system is shown in FIGS. 6–8. A series of available winding configurations for one phase, based on coil sets as shown in the prior embodiments, are developed as shown in FIG. 6. Case A is the reference configuration. Case B is developed by shifting case A by 9 slots to the right. Cases A and B will each produce the appropriate magnetic pole distribution and thus either configuration can be used as a basic design. Case C is developed by shifting Case B by 9 slots to the right, but since this is a repetition of Case A, it does not provide an additional selection. Case D has coils offset from Case A by 3 slots to the right and will not provide the same, and therefore a proper, electromagnetic field as Case A. Case E differs from the other cases in providing for initiating the winding of the outer coil of the dual coil unit rather than the inner coil as set forth in cases A and B. Generally, automated winding machine for winding of the coils and, insertion into the coil slots require a predefined winding patterns as shown in case A and B, for example, and Case E would therefore be an unacceptable winding configuration. In an automated system, a program could develop the various possible winding configurations and select Case A and B for consideration. The selection of Case A or Case B, as shown in FIG. 7 permits the different conventional terminal connections as illustrated.

Referring to FIG. 7 with the above conventions and different terminal assignments, both Case A and Case B provide for two different phase connections. Further, in connection with the total phase winding, each separate phase can be wound with an appropriate available winding independently of the other phases as long as a proper magnetic phase displacement and magnetic poles are maintained. Thus with the illustrated embodiment there are two different phase winding configurations and two possible terminal connections for each winding configuration, thereby establishing four different available phase windings for each of the phases. As each phase winding is independent of other phase winding as noted above, the combination of the two winding and two terminal connections for a three phase winding is raised to a power of three, producing 64 available permutations of available configurations. In equation form, the number of permutations would generally equal $[N*(C/2)!]^P$ where N and C are define as the number of available coil configurations per phase and the number of available terminal connections per phase, respectively and P is the number of phases. The formula is readily programmed in the computer which can automatically determine the number of available permutations and store them for analyses. The computer can then analyze and determine the appropriate winding configuration with each phase. As shown in the flow chart of FIG. 8 the program would determine the non-repeatable winding patterns (N) for each phase. In the above example the wye winding and connection would be introduced directly or determined under an appropriate program by the computer, as shown by steps 100, 101 and 102 in the flow chart. Based on this information, the available and operable winding patterns and connection configurations for the three phase winding would be establish. The program would then sequentially analyze each of the possible 64 configurations.

From the first selection (step 103), the program would proceed at step 104 to assign the voltage stress value in each slot to each coil set, and develop a Table I such as previously described, and then determine the coil-to-coil relative voltage stresses at step 105, producing a voltage stress map or Table II, such as previously described. Based on a selected criteria for the particular motor winding, a voltage stress measure, such as a number for the preferred criteria, would be assigned to this configuration as shown at step 106. The criterium may merely assign a numerical value to the configurations as a whole. However, in a preferred system, the program would assign penalty or adverse points in the comparison to those occurrences of voltage stress values which exceed a predetermined threshold, so that the overall pattern would reduce the voltage stress conditions which minimize the higher voltage stresses throughout the winding. Thus, the lower values would appear to be the more desirable configurations, and with a simple, direct numerical comparison of the values assigned to result in the saving of the most favorable winding pattern analyzed in each sequence of the program. A comparison would be made at step 107, to compare the measure with any previous measure. With the first winding configuration, the measure is the preferred and the measure value is stored at step 108.

The program would then step to make a comparison as at 109 and determine whether this is the last available configuration to be analysis. On determination that additional configurations are available, the program would select the next configuration as shown at step 110 and then initiate moving directly to the analyze by a relative voltage assignment (step 104): build the relative voltage stress table; build the coil-to-coil voltage stress map or tatble and assign a related measure of the voltage stress configuration based on the same predetermined criteria function as previously applied to the first configuration; all as shown in step 104, 105 and 106 respectively. At step 107, a comparison of above voltage stress measure with the measure of the previously stored current configuration of step 108. If the new measure is more favorable, such as a lower value than that of the stored unit or configuration, the program move to replace the previous current configuration with the new configuration. If it was not more favorable than the current configuration, the program move directly to the determination of the last configuration in step 109. Being only the second of sixty-four, the program would move to step 110 to select the third configuration. The third and all of subsequent configurations would be similarly analyzed and the most favorable configuration stored until all configurations are analyzed and the lowest measure stored at step 108. When the last configuration is noted at step 109, the program ends with the lowest voltage stress map and configuration based on the predetermine criteria available as set forth in the storage of the current configuration.

A computerized system and method may complete the process or make an intermediate presentation of any of the basic visual tables or slot distribution presentations for manual process.

As noted previously, voltage stress conditions may exist within the stator slots wherein multiple layer windings are wound and the slots are shared by coil sides of significantly different voltage. Lap windings, are typical windings wherein intraslot voltages are particularly significant but may also be of interest in other windings. Where the coil sides of significantly different voltages are placed in a single slot, slot cell separators must be interposed between the coils of differing voltages. Such slot cell separators must also be installed with skill and care to ensure that stray conductors of a given coil do not breach the separator and physically contact the conductors of the other coil side occupying the same slot.

Figure 9:
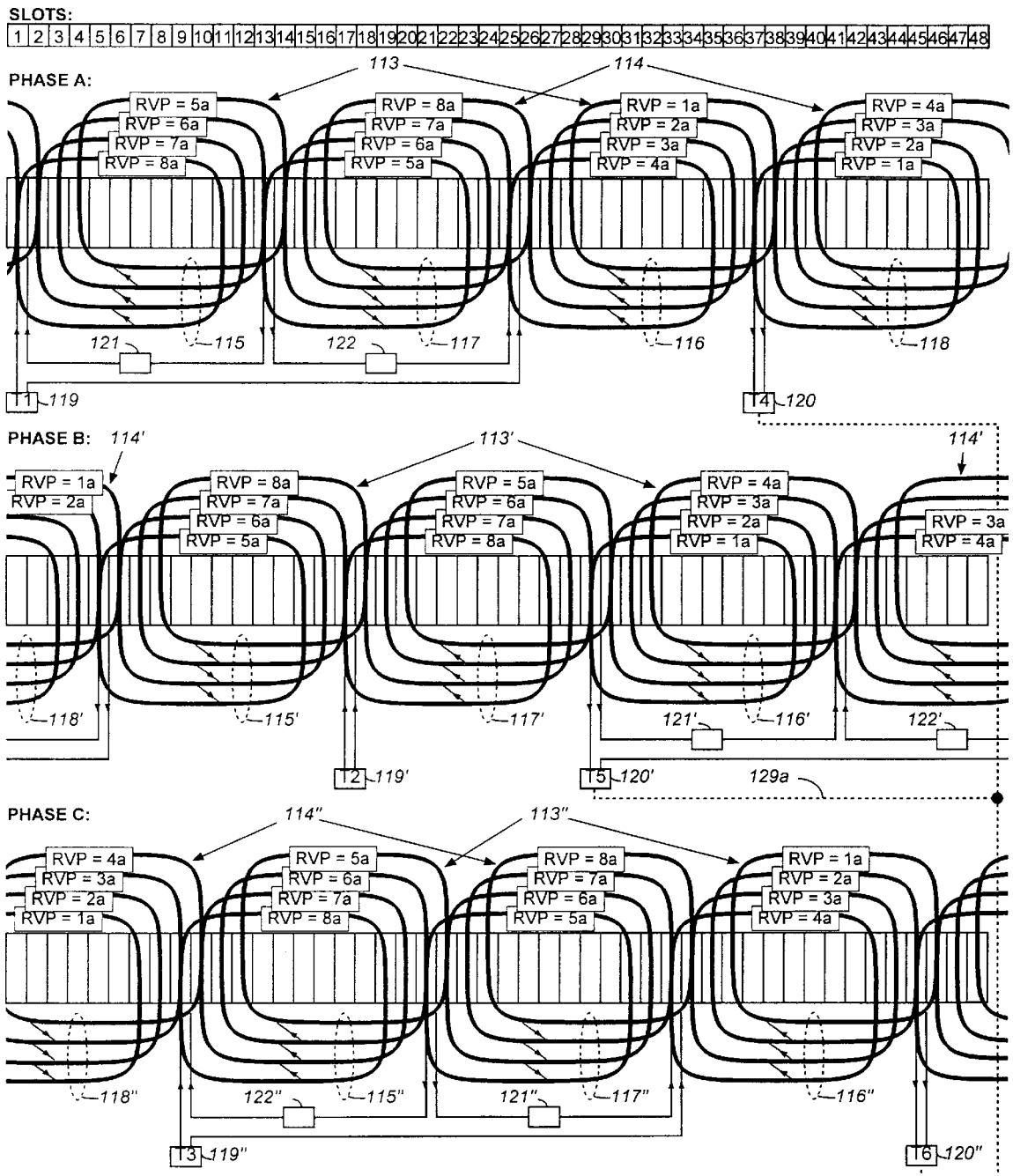
FIG. 9 is a view similar to FIGS. 3 and 4 for three phase motor with a lap winding in a wye connection.

A typical lap winding for a three-phase dynamoelectric such as a three phase AC motor is illustrated in FIG. 9. The illustrated winding diagram is shown as in the prior winding diagrams, with each of the three phases A, B and C separately illustrated.

A stator core 111 includes 48 slots in the embodiment of FIG. 9. The slots are numbered 1 through 48 for reference purposes. Each phase winding A, B and C is similarly wound and interconnected in a wye winding configuration in the illustrated embodiment.

Phase A includes two separate phase windings 113 and 114. Each winding 113 and 114 includes a pair of multi-coil pole windings 115 and 116 and 117 and 118 respectively. Each pair of the pole windings are spaced by 180° and connected in series to define a four pole winding and six leads. In the illustrated embodiment, the phase windings 113 and 114 are connected in parallel between terminal connectors 119 and 120 as a result of the selected separate connection between the coil units at 121 and 122 to form one phase of a wye winding.

More particularly, phase A winding includes the first multi-coil pole winding 115 wound in slots 1–14 and the second multiple coil pole winding 116 wound in slots 25–38. Similarly, the two pole multi-coil pole windings 117 and 118 are shown wound respectively in slots 13 through 26 and slots 37 through slot 2.

A review of the phase A winding illustrates various slots including coil sides of two completely different coils of the several windings of phase A at the ends of each pole winding. In particular, slots 1, 2, 13, 14, 25, 26, 37 and 38 of FIG. 9 each include one side of two different coil sides of windings of the phase A windings, and are identified as shared slots.

An analysis of phases B and C in FIG. 9 disclose each similarly wound with two phase windings 113' and 114' and 113" and 114" respectively, each having 180° spaced multi-coil pole windings 117' and 118' and 117" and 118" identified by prime and double prime numbers, and connected in series.

A review of phases B and C shows similar different winding coil sides within shared slots.

In addition, a comparison of the core 111 for the three phases A, B and C, in particular, each phase with respect to each other phase, illustrates shared slots with coil sides of coils from the several phases.

For example, referring to phase A and phase B, slots 3 and 4 are shared slots as shown by correspondingly referenced coil sides of coils 115 and 118' in slot 3 and slot 4. Slots 15, 16, 27, 28 and 39 and 40 also clearly include coils from phases A and B and are shared slots.

Comparison of phases A and C clearly disclose shared slots 11, 12, 23, 24, 35, 36, 47 and 48.

Similarly, a comparison of phases B and C illustrates shared slots 7, 8, 19, 20, 31, 32, 43 and 44.

Wherever there is a shared slot arrangement, electrical insulators must be provided within the coil sides in the shared slot as such because of the different voltage potentials between the coil sides. The shared slots of the coils of the same phase generally do not have as great a voltage potential difference as the coals from different phases, but in all events, insulation must be provided.

Figure 10:
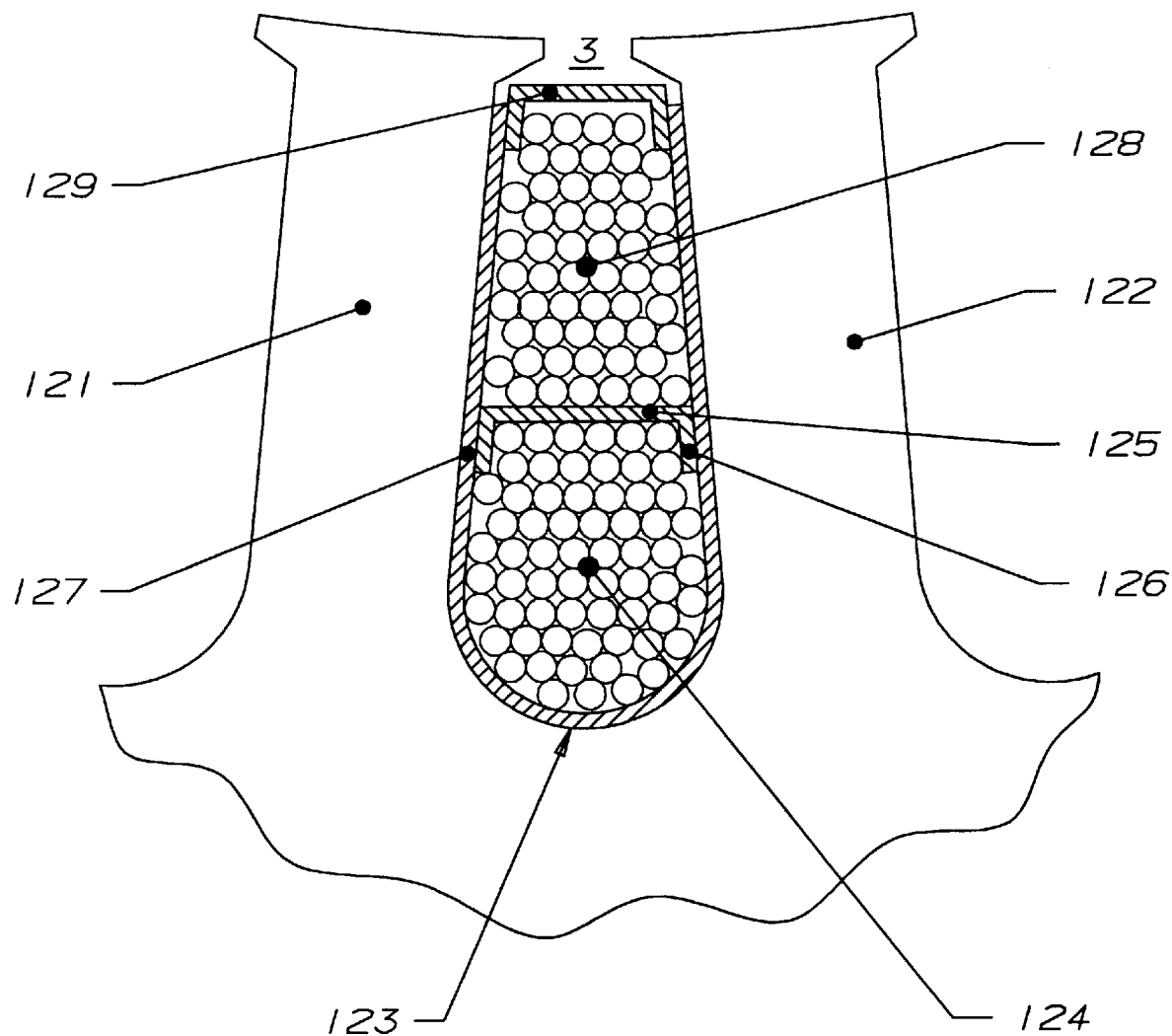
FIG. 10 is a diagrammatic view of one slot shown in FIG. 9.

For example, FIG. 10 illustrates a cross sectional view of a single slot 111 for the lap winding, such as the slot numbered 3.

In FIG. 10, two adjacent teeth 121 and 122 of the annular core 111 are illustrated and defined a generally U-shaped slot 123. A third side 124 of phase A coil 115 is wound within the bottom of the shared slot 3. The coil side 124 will form part of the coil of phase pole winding 115 such as illustrated in FIG. 9. A slot cell separator 121 is secured in overlying relationship to the face of the coil side 124. A typical separator is formed of a suitable insulating paper or other material, and as a generally inverted U-shaped configuration with the sidewalls 126 telescoped or extended over the coil side and into abutting engagement with the slot walls as at 127.

A phase B coil 118' has a coil side 128 sharing the slot 112 is wound within the top or outer portion of the member slot 3. The coil sides 124 and 128 substantially fill the slot to the outer slot opening. A generally U-shaped separator 129 closes the slot opening and locks the coil sides 124 and 128 within the slot numbered 3.

The coils of sides 124 and 128 will be connected to different voltages and substantial voltage stress can be created within the shared slot numbered 3 in much the same manner as in the end turn regions of the prior embodiment.

The same analysis as previously provided with respect to the concentric windings can readily be applied to the various available lap windings, with voltage referenced values assigned to each coil of each coil pole winding of each phase; for example, as shown in the following Table V for FIG. 9.

TABLE V

Lap Winding Configuration No. 1 FIG. 9

| Coil # | Phase | Slot Location | Relative Voltage Potential |
|---|---|---|---|
| 115 | A | 1-11 | 8a |
| 115 | A | 2-12 | 7a |
| 115 | A | 3-13 | 6a |
| 115 | A | 4-14 | 5a |
| 115' | B | 15-5 | 5a |
| 115' | B | 16-6 | 6a |
| 115' | B | 17-7 | 7a |
| 115' | B | 18-8 | 8a |
| 115" | C | 9-19 | 8a |
| 115" | C | 10-20 | 7a |
| 115" | C | 11-21 | 6a |
| 115" | C | 12-22 | 5a |
| 117 | A | 23-13 | 5a |
| 117 | A | 24-14 | 6a |
| 117 | A | 25-15 | 7a |
| 117 | A | 26-16 | 8a |
| 117' | B | 17-27 | 8a |
| 117' | B | 18-28 | 7a |
| 117' | B | 19-29 | 6a |
| 117' | B | 20-30 | 6 |
| 117" | C | 31-21 | 5a |
| 117" | C | 32-22 | 6a |
| 117" | C | 33-23 | 7a |
| 117" | C | 34-24 | 8a |
| 116 | A | 25-35 | 4a |

TABLE V-continued

Lap Winding Configuration No. 1 FIG. 9

| Coil # | Phase | Slot Location | Relative Voltage Potential |
|---|---|---|---|
| 116 | A | 26-36 | 3a |
| 116 | A | 27-37 | 2a |
| 116 | A | 28-38 | 1a |
| 116' | B | 39-29 | 1a |
| 116' | B | 40-30 | 2a |
| 116' | B | 41-31 | 3a |
| 116' | B | 42-32 | 4a |
| 116" | C | 33-43 | 4a |
| 116" | C | 34-44 | 3a |
| 116" | C | 35-45 | 2a |
| 116" | C | 36-46 | 1a |
| 118 | A | 47-37 | 1a |
| 118 | A | 48-38 | 2a |
| 118 | A | 1-39 | 3a |
| 118 | A | 2-40 | 4a |
| 118' | B | 41-3 | 4a |
| 118' | B | 42-4 | 3a |
| 118' | B | 43-5 | 2a |
| 118' | B | 44-6 | 1a |
| 118" | C | 7-45 | 1a |
| 118" | C | 8-46 | 2a |
| 118" | C | 9-47 | 3a |
| 118" | C | 10-48 | 4a |

A slot-by-slot comparison is then made for the relative voltage potential difference between all of the phases and an appropriate table generated of the slot voltage stresses, such as shown in following Table VI from which the analysis of a desired or preferred voltage stress distribution can be readily determined for the various analyzed allowable lap windings based on preselected criteria.

TABLE VI

Lap Winding Configuration No. 1 FIG. 9

| Slot No. | A-B Endturn Stress | B-C Endturn Stress | C-A Endturn Stress | Intraslot Stress |
|---|---|---|---|---|
| 1 | 12 | 8 | 12 | 11 |
| 2 | 12 | 8 | 12 | 11 |
| 3 | 12 | 8 | 12 | 10 |
| 4 | 12 | 7 | 11 | 8 |
| 5 | 12 | 6 | 10 | 3 |
| 6 | 12 | 6 | 10 | 3 |
| 7 | 12 | 7 | 11 | 4 |
| 8 | 12 | 8 | 12 | 6 |
| 9 | 16 | 12 | 12 | 11 |
| 10 | 16 | 12 | 12 | 11 |
| 11 | 16 | 12 | 12 | 14 |
| 12 | 15 | 12 | 11 | 12 |
| 13 | 14 | 12 | 10 | 11 |
| 14 | 14 | 12 | 10 | 11 |
| 15 | 15 | 12 | 11 | 8 |
| 16 | 16 | 12 | 12 | 10 |
| 17 | 16 | 16 | 16 | 11 |
| 18 | 16 | 16 | 16 | 11 |
| 19 | 16 | 16 | 16 | 14 |
| 20 | 15 | 15 | 16 | 12 |
| 21 | 14 | 14 | 16 | 11 |
| 22 | 14 | 14 | 16 | 11 |
| 23 | 15 | 15 | 16 | 12 |
| 24 | 16 | 16 | 16 | 14 |
| 25 | 16 | 16 | 16 | 11 |
| 26 | 16 | 16 | 16 | 11 |
| 27 | 12 | 16 | 12 | 10 |
| 28 | 12 | 15 | 11 | 8 |
| 29 | 12 | 14 | 10 | 11 |
| 30 | 12 | 14 | 10 | 11 |
| 31 | 12 | 15 | 11 | 12 |
| 32 | 12 | 16 | 12 | 14 |
| 33 | 12 | 16 | 12 | 11 |

TABLE VI-continued

Lap Winding Configuration No. 1 FIG. 9

| Slot No. | A-B Endturn Stress | B-C Endturn Stress | C-A Endturn Stress | Intraslot Stress |
|---|---|---|---|---|
| 34 | 12 | 16 | 12 | 11 |
| 35 | 8 | 12 | 12 | 6 |
| 36 | 7 | 12 | 11 | 4 |
| 37 | 6 | 12 | 10 | 3 |
| 38 | 6 | 12 | 10 | 3 |
| 39 | 7 | 12 | 11 | 8 |
| 40 | 8 | 12 | 12 | 10 |
| 41 | 8 | 12 | 12 | 11 |
| 42 | 8 | 12 | 12 | 11 |
| 43 | 8 | 8 | 8 | 6 |
| 44 | 7 | 7 | 8 | 4 |
| 45 | 6 | 6 | 8 | 3 |
| 46 | 6 | 6 | 8 | 3 |
| 47 | 7 | 7 | 8 | 4 |
| 48 | 8 | 8 | 8 | 6 |

Those skilled in the art can readily provide the analysis in the same manner as previously described and no further description thereof is deemed necessary or desirable.

Figure 11:
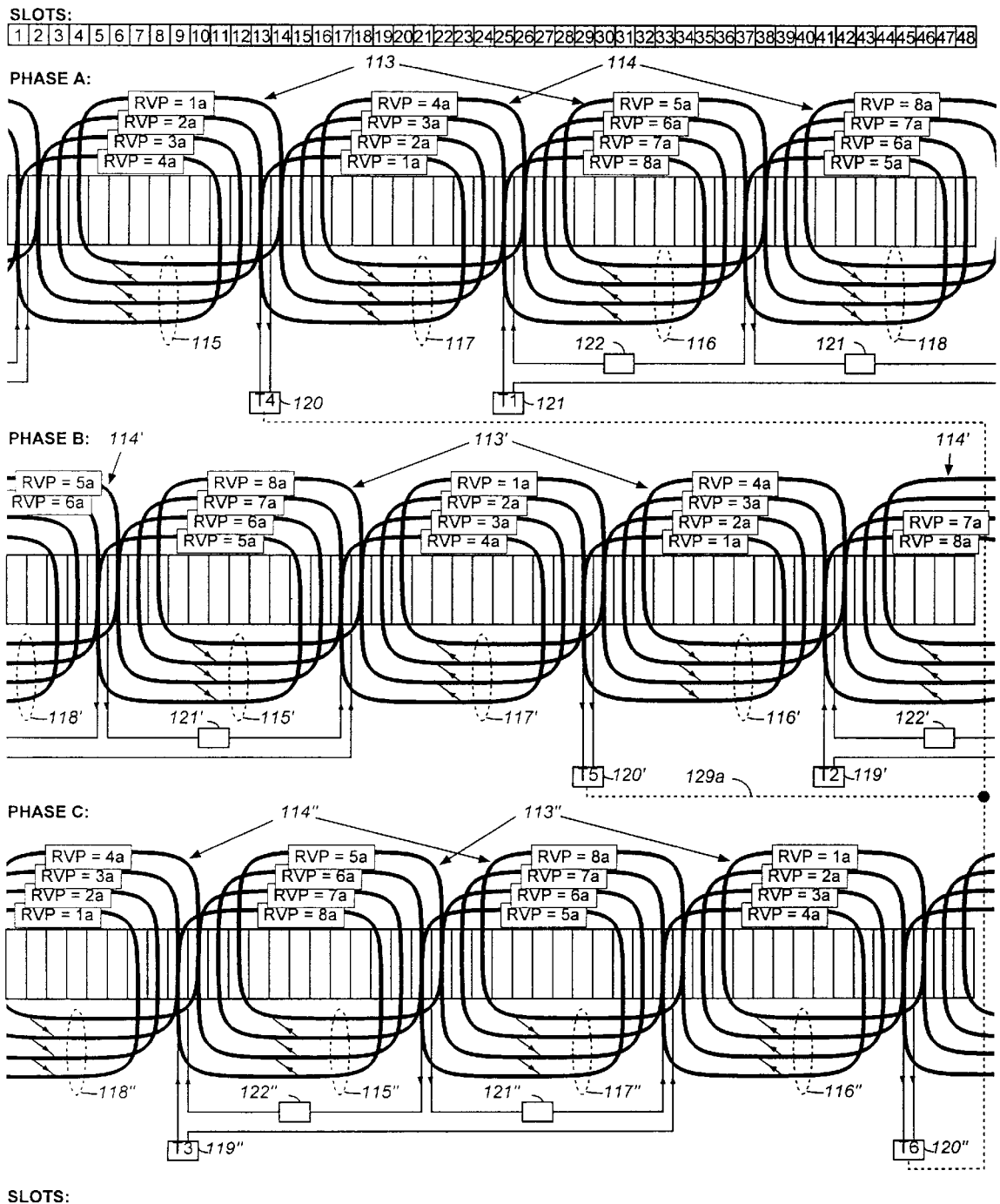
FIG. 11 is a view similar to FIG. 9 illustrating an alternate winding configuration.

In the alternate embodiment of FIG. 11, the coil arrangements are identically located and correspondingly numbered. The voltage terminal connections however, are varied to connect different coil units in circuit. In FIG. 11, coil units 115 and 116 are connected in series via the selected connector 121 and coil units 117 and 118 are similarly connected in series via the connector 122 between the motor terminals 119 and 120.

In FIG. 11, the assigned relative voltage values would be as shown in the following Table VII.

TABLE VII

Lap Winding Configuration No. 2 FIG. 11

| Coil # | Phase | Slot Location | Relative Voltage Potential |
|---|---|---|---|
| 115 | A | 1-11 | 4a |
| 115 | A | 2-12 | 3a |
| 115 | A | 3-13 | 2a |
| 115' | B | 4-14 | 1a |
| 115' | B | 15-5 | 5a |
| 115' | B | 16-6 | 6a |
| 115' | B | 17-7 | 7a |
| 115' | B | 18-8 | 8a |
| 115" | C | 9-19 | 8a |
| 115" | C | 10-20 | 7a |
| 115" | C | 11-21 | 6a |
| 115" | C | 12-22 | 5a |
| 117 | A | 23-13 | 1a |
| 117 | A | 24-14 | 2a |
| 117 | A | 25-15 | 3a |
| 117' | B | 26-16 | 4a |
| 117' | B | 17-27 | 4a |
| 117' | B | 18-28 | 3a |
| 117' | B | 19-29 | 2a |
| 117' | B | 20-30 | 1a |
| 117" | C | 31-21 | 5a |
| 117" | C | 32-22 | 6a |
| 117" | C | 33-23 | 7a |
| 117" | C | 34-24 | 8a |
| 116 | A | 25-35 | 8a |
| 116 | A | 26-36 | 7a |
| 116 | A | 27-37 | 6a |
| 116 | A | 28-38 | 5a |
| 116' | B | 39-29 | 1a |
| 116' | B | 40-30 | 2a |
| 116' | B | 41-31 | 3a |
| 116' | B | 42-32 | 4a |
| 116" | C | 33-43 | 4a |

TABLE VII-continued

Lap Winding Configuration No. 2 FIG. 11

| Coil # | Phase | Slot Location | Relative Voltage Potential |
|---|---|---|---|
| 116" | C | 34-44 | 3a |
| 116" | C | 35-45 | 2a |
| 116" | C | 36-46 | 1a |
| 118 | A | 47-37 | 5a |
| 118 | A | 48-38 | 6a |
| 118 | A | 1-39 | 7a |
| 118 | A | 2-40 | 8a |
| 118' | B | 41-3 | 8a |
| 118' | B | 42-4 | 7a |
| 118' | B | 43-5 | 6a |
| 118' | B | 44-6 | 5a |
| 118" | C | 7-45 | 1a |
| 118" | C | 8-46 | 2a |
| 118" | C | 9-47 | 3a |
| 118" | C | 10-48 | 4a |

The slot-by-slot comparison provides a voltage stress as shown in the following Table VIII.

TABLE VIII

Lap Winding Configuration No. 2 FIG. 11

| Slot No. | C-A Endturn Stress | B-C Endturn Stress | A-B Endturn Stress | Intraslot Stress |
|---|---|---|---|---|
| 1 | 12 | 12 | 16 | 11 |
| 2 | 12 | 12 | 16 | 11 |
| 3 | 8 | 12 | 12 | 10 |
| 4 | 8 | 11 | 11 | 8 |
| 5 | 8 | 10 | 10 | 11 |
| 6 | 8 | 10 | 10 | 11 |
| 7 | 8 | 11 | 11 | 8 |
| 8 | 8 | 12 | 12 | 10 |
| 9 | 12 | 16 | 12 | 11 |
| 10 | 12 | 16 | 12 | 11 |
| 11 | 12 | 16 | 12 | 10 |
| 12 | 11 | 16 | 11 | 8 |
| 13 | 10 | 16 | 10 | 3 |
| 14 | 10 | 16 | 10 | 3 |
| 15 | 11 | 16 | 11 | 8 |
| 16 | 12 | 16 | 12 | 10 |
| 17 | 12 | 16 | 12 | 11 |
| 18 | 12 | 16 | 12 | 11 |
| 19 | 12 | 12 | 8 | 10 |
| 20 | 11 | 11 | 8 | 8 |
| 21 | 10 | 10 | 8 | 11 |
| 22 | 10 | 10 | 8 | 11 |
| 23 | 11 | 11 | 8 | 8 |
| 24 | 12 | 12 | 8 | 10 |
| 25 | 16 | 12 | 12 | 11 |
| 26 | 16 | 12 | 12 | 11 |
| 27 | 16 | 12 | 12 | 10 |
| 28 | 16 | 11 | 11 | 8 |
| 29 | 16 | 10 | 10 | 3 |
| 30 | 16 | 10 | 10 | 3 |
| 31 | 16 | 11 | 11 | 8 |
| 32 | 16 | 12 | 12 | 10 |
| 33 | 16 | 12 | 12 | 11 |
| 34 | 16 | 12 | 12 | 11 |
| 35 | 12 | 8 | 12 | 10 |
| 36 | 11 | 8 | 11 | 8 |
| 37 | 10 | 8 | 10 | 11 |
| 38 | 10 | 8 | 10 | 11 |
| 39 | 11 | 8 | 11 | 8 |
| 40 | 12 | 8 | 12 | 10 |
| 41 | 12 | 12 | 16 | 11 |
| 42 | 12 | 12 | 16 | 11 |
| 43 | 12 | 12 | 16 | 10 |
| 44 | 11 | 11 | 16 | 8 |
| 45 | 10 | 10 | 16 | 3 |
| 46 | 10 | 10 | 16 | 3 |
| 47 | 11 | 11 | 16 | 8 |
| 48 | 12 | 12 | 16 | 10 |

FIG. 11 is a view similar to FIG. 9 illustrating an alternate winding configuration with the parallel connected coils in a four-pole, six-lead configuration for a three-phase AC motor.

The end turn voltage stresses differ somewhat but not drastically. The intraslot stresses however vary significantly in the two configurations, and the second configuration reduced the maximum intraslot stress to 11 compared to 14 in the first configuration. The maximum end turn stress has the same maximum in each instance.

Figure 16:
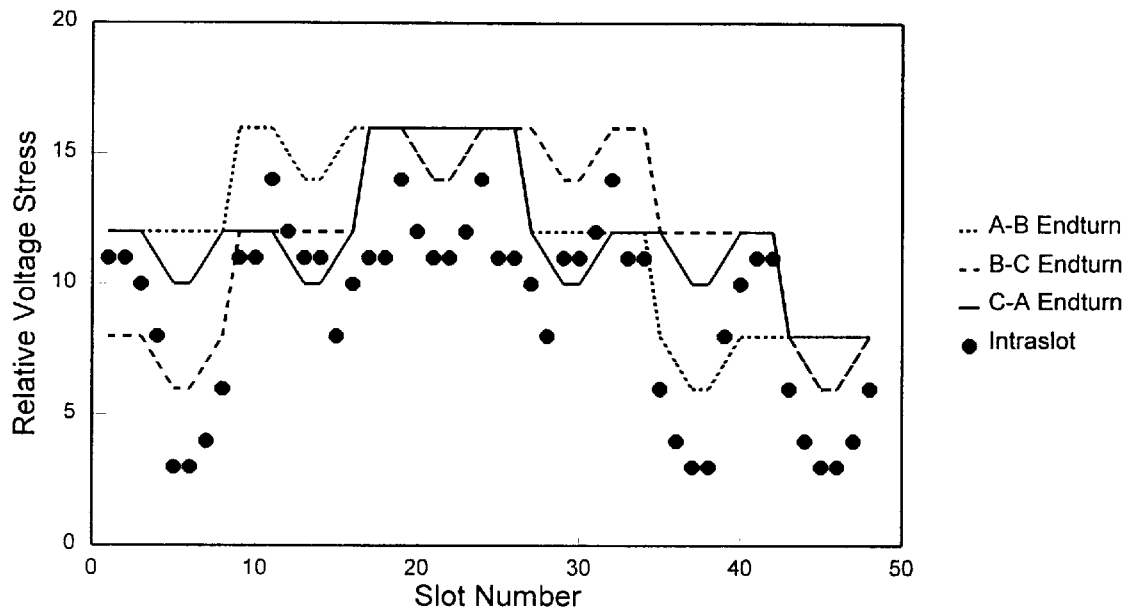
FIGS. 16 and 17 are graphical illustrations of voltage stress valves for the winding configurations of FIGS. 9 and 11.
Figure 17:
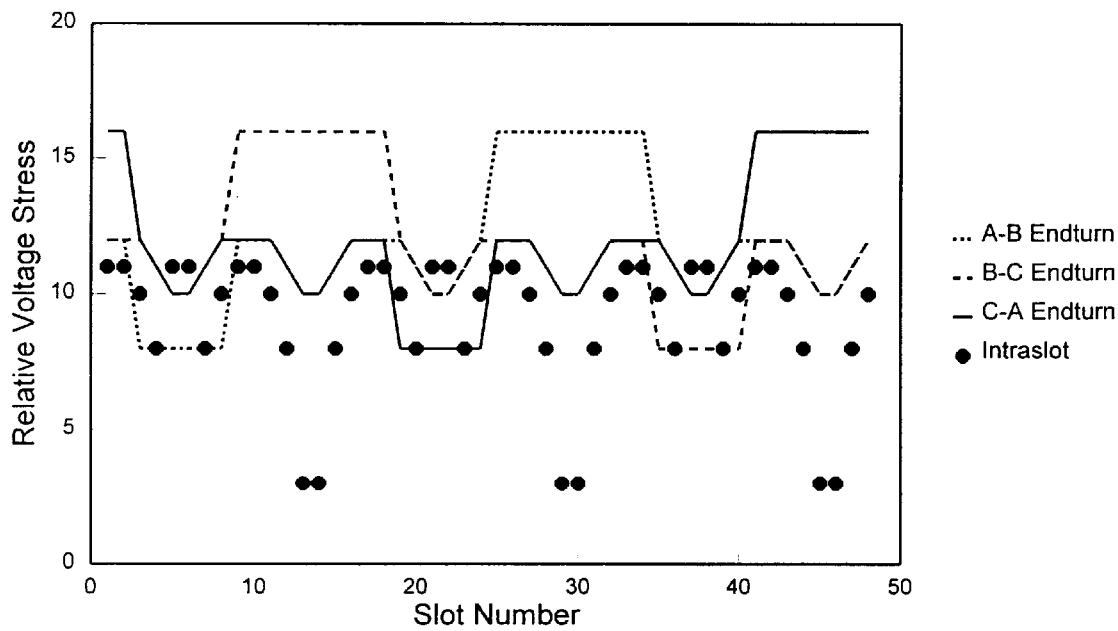

The analysis was computer based and the graphical output produced for these two configurations is shown in FIGS. 16 and 17.

The curves of the end turns have overlapping portions as well as diverging portions and are shown in overlapping relationship. The intraslot voltage stress conditions are shown for each slot by a filled circle illustration.

Figure 12:
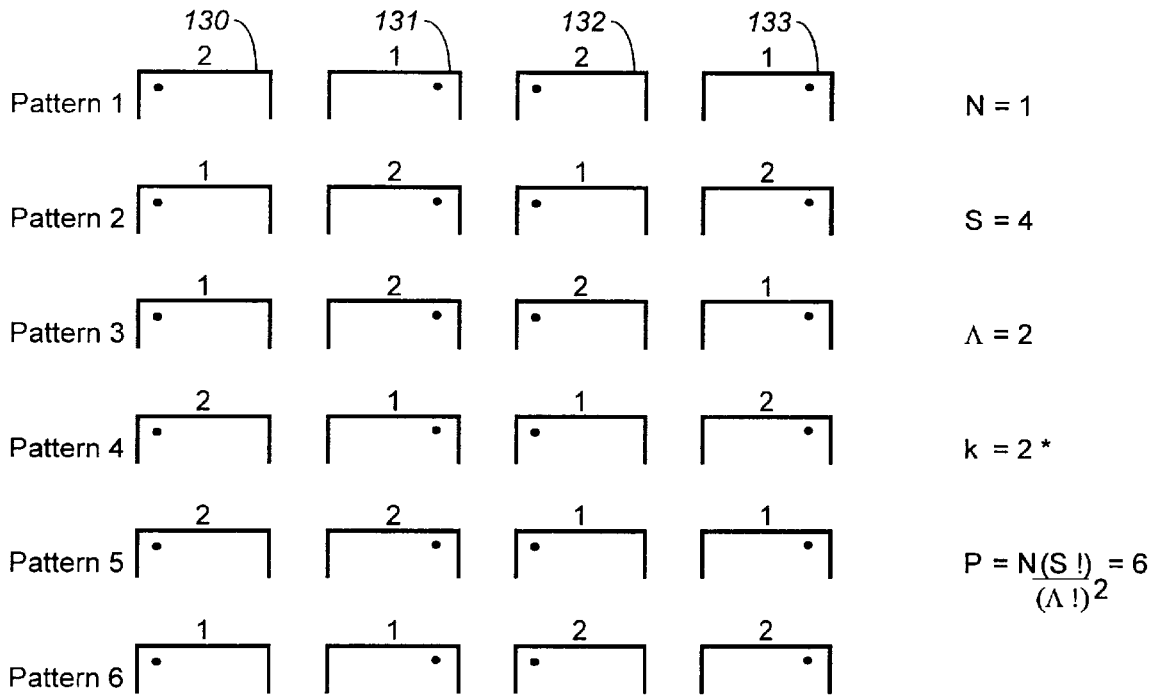
FIGS. 12–15 are diagrammatic illustrations of basic coil units forming different winding segments and windings configurations formed thereby.

In the various forms of typical concentric and lap windings shown, the several windings in commercial practice consist of a plurality of individual coil units, each of which produces in the final winding a north pole or a south pole. Each coil unit consist of one or more individual coils, with the coils within any coil unit connected in series and all coil units span a corresponding equal number of slots in any given design. In addition, the coils of any individual coil unit has its winding turns correspondingly wound within the assigned slots with a corresponding spacing and construction from a single continuous conductor. In various windings, the coil units are wound from a single conductor. For example, as shown in FIG. 12, the opposite ends of the series-connected coil units define north and south poles connected to output terminals. With a lap winding as shown in FIGS. 9 or 11, the coil unit-s are shown as generally wound as individual coil units with external end leads. Thus, each coil unit is wound from a single uninterrupted conductor with the ends of the coil units extended for subsequent connection as wound, as by the connectors 121 and 122, or connected in series within a single leg as shown for the concentric windings. The connections are made subsequent to the actual winding to interconnect the coils in accordance with the desired circuit connection as fully discussed above.

Each of the phase windings are designed to be machine wound, with winding segments which will consist of one or more coil units.

As used herein, a winding segment consist of one or more individual coil units which are wound from a single uninterrupted or continuous conductor or wire. The segment may include a single coil unit or series connected coil units.

The windings are universally machine wound with the machinery having certain limitations with respect to winding ability. As previously discussed, the winding of multiple coils into a coil unit may require initiating the winding with the first coil or innermost coil of the coil unit. Alternatively, it may require winding with stepped coils in the coil unit, such as shown for the lap winding, wherein the individual coils are not wound concentrically as in a concentric winding, but rather with the coil sides of a number of coils distributed throughout all the immediately adjacent slots assigned to the coil unit. In all cases, the coil units have overlapping end turns and in the case of lap windings, shared slots including coil sides of different coil units within the same phase, as well as shared slots with the windings of different phases in a multiple phase winding. All voltage stresses within the winding will generally be considered in the designing of the motor application.

The inventor has found that a preferred method individually considers the segments as such to determine the various winding permutations available in windings patterns, and in particular to select non-repeating winding patterns. As noted, the non-repeating winding patterns will be determined by the electromagnetic requirements to be produced as well as the manufacturing process and machinery. The non-repeating winding patterns will be those which have a winding pattern in which the winding segments are uniquely positioned within the slotted core while providing the basic requirements of the magnetomotive forces when energized at an appropriate level and polarity of current in accordance with well known technology. The inventor has recognized that each phase winding is made up of one or more coil units forming one or more identified winding segment (S) having its own unique voltage stress characteristic, as more fully described hereinafter. In any given winding, each segment will have a particular voltage stress characteristic and each segment can be identified for purposes of analysis by an appropriate descriptor, such as a number. The number of instances of unique descriptors occurring in any given winding is a significant factor for analysis and may be identified, for example, by the Lambda (Λ) symbol. With the above information and with the above notation, a generalized equation will provide the identification of the non-repeatable available unique winding permutations for each phase of any given winding.

Once the number of permutations have been determined, the coil-to-col and intraslot (shared slot) analysis of the relative voltage stress conditions at each slot are to be calculated generally in the same manner as noted previously.

The possible voltage stress permutations is dependent upon the number of winding segments (S), the number of unique voltage stress descriptors (k) for all winding segments. Those windings having less segments than poles, such as the winding of FIG. 9, may include a descriptor comprised of a sequence of relative voltage stress values. In the winding of FIG. 3, the leftmost winding descriptor would be $d_1$ identified as (6a-5a-4a) and the rightmost winding descriptor would be $d_2$ identified as (3a-2a-1a). In addition, the number of occurences of each relative voltage stress descriptor is identified by the Lambda symbol "Λ". Referring to FIG. 3 as set forth above would be one when the two descriptors $d_1$ and $d_2$ are used only once per phase. The possible voltage stress permutations (P) per phase is given by the equation:

$$P = \frac{N \cdot S!}{(\Lambda!)^k}$$

Based on this equation, the winding is analyzed for the coil-to-coil, and when applicable on the intraslot, relative voltage stress values.

The number of calculations to be made Q will be the product for the three phases. In equation form, the number Q calculations would be equal to the following:

$$Q = \prod_{N=1}^{\phi} P_N$$

where $\Phi$ is the number of phases and $P_N$ is the number of possible relative voltage stress patterns for the Nth phase. For a typical three phase winding, there would of course be the three different phase windings, each of which would require the separate calculation of the permutations and with the product of all providing the total voltage stress characteristic result.

For example, in FIG. 12, there is a diagrammatic illustration of the four coil units 130, 131, 132, 133 of a lap winding. Each coil unit is diagrammatically shown by an inserted line drawing. A dot indicates the polarity. A dot to the left side, for discussion, is a north pole and a dot to the right side is a south pole, based on a normal assumption of the current supplied to the left side for a north pole and the right side for a south pole. As each coil unit individually ends in available terminal connections or leads, there is a single non-repeatable unique winding pattern (N), namely, the coil units as shown. Each coil unit is separate and therefore a winding segment. There are four winding segments (S). The number of individual descriptors (k) is two, identifying either "2" or "1". Lambda is 2 since each descriptor, "2" and "1", occurs twice. Solving the basic formula for determining the number of winding permutations per phase results in identification of six (6) different unique winding patterns and permutathons for each phase, as shown in FIG. 12. This of course would require individual processing of each of the three phases resulting in 6×6×6 or 216 winding configurations and calculations for a four pole, two parallel circuit winding.

The coil units can, as previously discussed, be wound with interconnection as winding segments.

Figure 13:
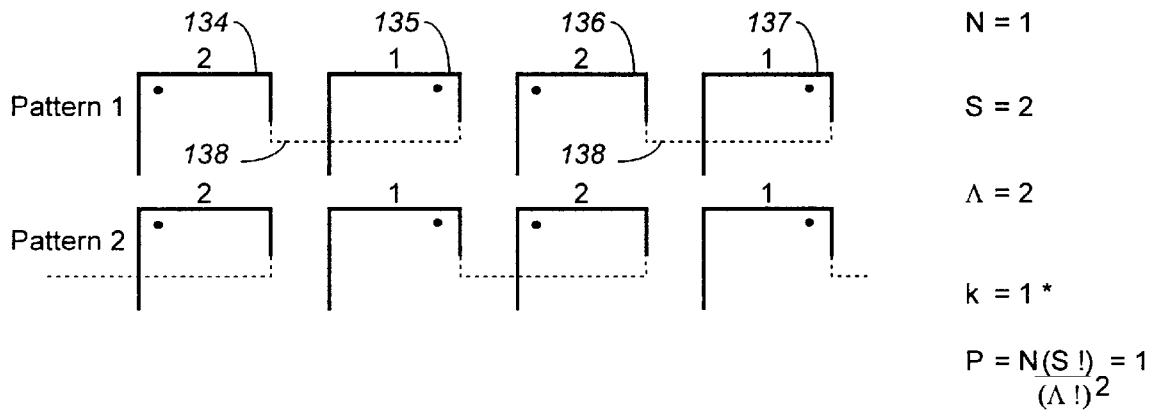

Thus, referring to FIG., 13, four coil units 134, 135, 136, and 137 are shown. In FIG. 13, the coil units 134 and 135 have the end leads shown to the right side interconnected by machine wound connector 138 and coil units 136 and 137 similarly connected by a connector 139 to provide two serial connected windings, each forming a segment. An analysis of this winding configuration based on the coil unit as such for a four pole, two parallel circuit winding, results in the following analysis. A single winding pattern (N), which is non-repeatable and unique, is presented with this combination. In this unique case, even though there are two different and unique voltage stress patterns, they do not produce truly different winding patterns. There is a mere shift of one pole to change from one to the next, and a second shift of the pole places the unit back into a previous configuration. There are, therefore, two windings segments (S). Again, the number of the instances of occurrence of each descriptor (Lambda) is two and the number of unique descriptors (K) is one, because "2-1" or "1-2" is an identical descriptor. Introducing the above numbers into the available relative stress patterns indicates that there is a single one pattern and P=1.

Figure 14:
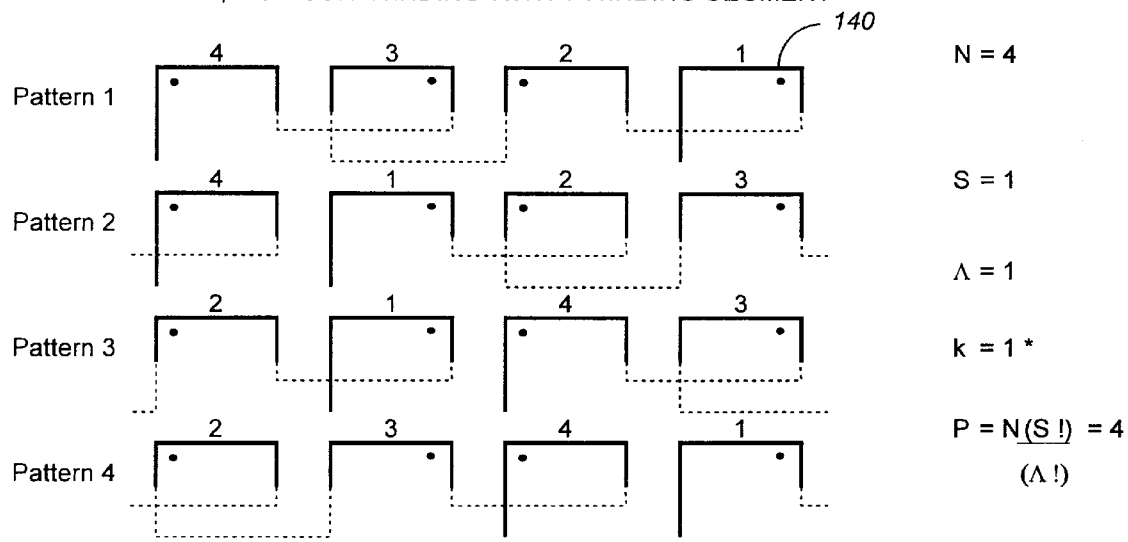
Figure 15:
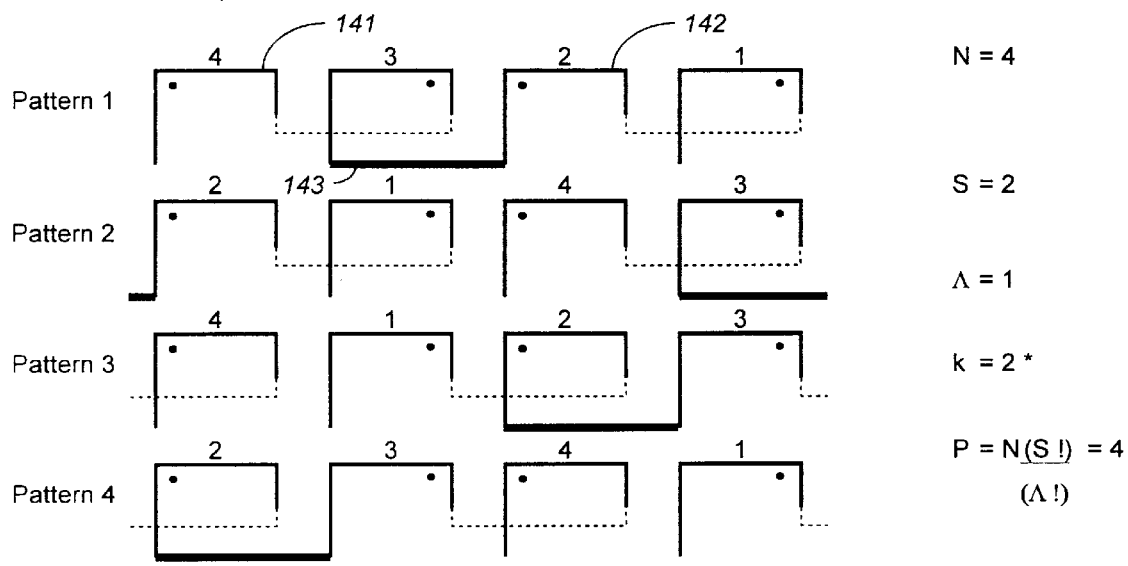

Other winding patterns are also shown in FIGS. 14 and 15. FIG. 14 shows a four pole, parallel winding circuit with a single winding segment 140. The four coil units are wound from a single conductor to form an uninterrupted series winding and therefore a single winding segment (S). The number of descriptors (K) is one; namely, the combination for all four poles "1-2-3-4" and that descriptor only occurs once. The winding can be rearranged as shown in FIG. 14 to produce four available different winding patterns (N). With a single segment and a single descriptor, the one descriptor appears once as the sequence is always "4-3-2-1" or "1-2-3-4". Solving the equation for any given phase results in an identification of the four different patterns (P).

FIG. 15 is a similar illustration of a four pole, single parallel circuit winding with two winding segments (S) 141 and 142. In this instance, the intermediate coils with the descriptors "2" and "3", are shown with the terminals interconnected by an optional and external connection line 143. This represents a connection for providing a dual voltage motor.

The circuit of FIG. 15 is analyzed with the individual segments based on the non-repeating winding patterns (N) equal to four. Again, it is assumed to have two segments (S) as the switching connection is a separate connection which is only made if the motor after winding is selected to provide a dual voltage construction motor. The number of instances of occurrences of each descriptor (Lambda Λ) is one and the number of unique voltage stress descriptors (k) is two: consisting of either "4-3" or "3-4" as one and "2-1" or "1-2" as a second.

Solving the equation establishes four voltage stress permutations per phase.

The above sets forth and identifies the analysis which will indicate the number of winding permutations which must be made for each particular sets of coil units and resulting winding patterns.

Figure 18:
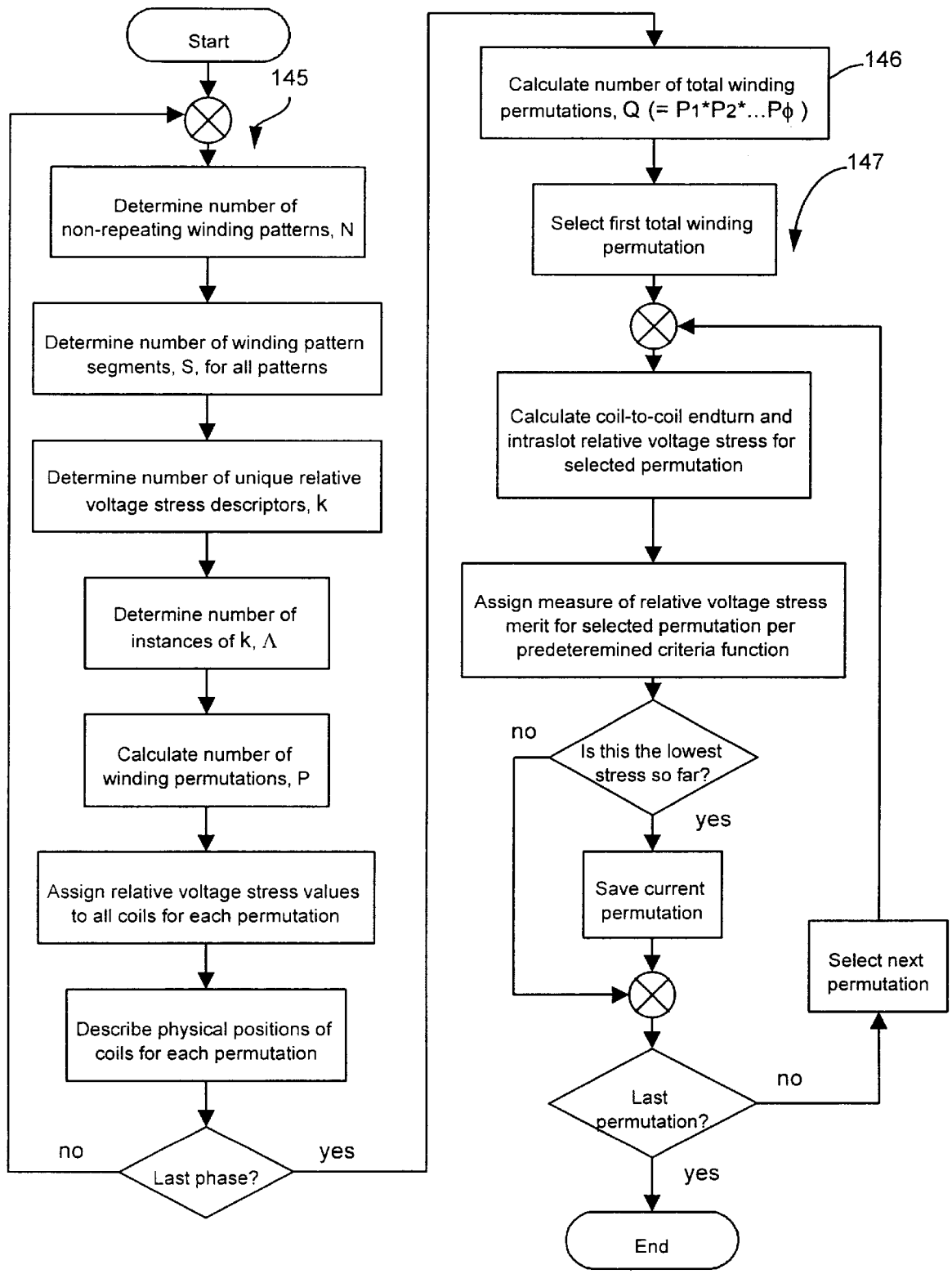
FIG. 18 is a flow chart of a computer program for the automated analysis of winding configurations.

This analysis can of course also be made through the computerized system and a flow chart indicating the process therefore is set forth in FIG. 18, consisting of a first channel or series of steps to fully describe all of the available winding configurations for each of the available phases as shown at 145. This is done by determining the number of non-repeating winding pattern (N). For any given coil configurations, the location of the coils within the slots are available. Each winding pattern is compared with the other available winding patterns and the non-repeating winding patterns and those which cannot be wound by the machine are removed to retain and store only the total number of patterns which can be wound for the particular motor.

The number of segments (S) for all patterns to be analyzed is determined. The number of unique relative voltage stress descriptors (k) is determined. The number of instances of each descriptor (Lambda Λ) is determined. From the above data and the basic equation, the member of winding permutations (P) to be available for each phase is calculated. Relative voltage stress values are assigned to all coils in each permutation and the physical positions of the coils for each permutation is described. This provides all of the necessary information for calculating the relationship with respect to all other coils within that winding and the basis for comparing it with respect to the windings and other phases.

The above sequence of steps is recycled until all of the phases have been similarly analyzed and stored. At the last phase analysis, the program steps to calculating the number of total winding permutations Q in accordance with the calculation equation as shown at 146. The program then steps to sequentially analyze the winding configurations, as shown at 147.

Each winding permutation as developed by the first sequence must be analyzed starting with a selection of a first of the total winding permutation. The analysis is set forth in FIG. 17 following a similar sequence as set forth in the prior described analysis as shown in FIG. 8.

The computer assignment of the coil descriptors include the configuration of the individual coil of each single coil unit, a plurality of interconnected coil units and configuration as a concentric or lap winding. For a lap winding of FIGS. 9 and 11, the relative voltage potential assignments would be as set forth in Tables V and VI, for each permutation.

The program may print out a lap winding stress table to provide for visual analysis and selection for each particular lap winding configuration, such as shown in the Tables VI and VIII. Obviously, where there are 216, such as given in one example for a lap winding, the computerized selection would be highly desirable, if not essential, for a cost effective system.

Each of the three phase windings A, B and C of FIGS. 9 and 11 can also be connected in a wye configuration with the terminals T4, T5 and T6 connected as the neutral terminal, as in the previous circuits. This form of winding is often used with a switching circuit under which a motor is operated in the starting condition in a wye configuration and after starting, switched to a delta configuration by a suitable switch system, not shown, for the connections 120, 120' and 120" from the delta connection to a common neutral connection, as shown by a dotted line connection 129a in FIG. 11. This provides a desired starting torque while maintaining an improved running condition. The voltage stress conditions may therefore be desirably analyzed, by those skilled in the art, under both a wye and a delta circuit connection to consider all possible stress conditions.

Other winding configurations will, of course, be readily provided by those skilled in the art.

In summary, in accordance with the apparatus and method of the present invention, the optimal arrangement of the coils and circuit connections will be readily determined by those skilled in the art and the production location of the coils and circuit interconnections of the coils readily established. The result will be an end turn and intraslot voltage stress relationship within the production motor to prevent abnormal and rapid destruction of the insulation within the end turns and/or within the slots and production of higher quality motors in which the life of the winding is extended and generally maximized.

Various modes of carrying out the invention are contemplated as being within the scope of the following claims particularly pointing out and distinctly claiming the subject matter which is regarded as the invention.

I claim:

1. The process of determining the voltage stresses in a plurality of overlapping winding coils distributed within a slotted core of an AC dynamoelectric machine with AC voltage terminals to form a first winding configuration producing the coils, said coil distribution within the slots producing the necessary magnetic field for operation of the dynamoelectric machine, comprising the steps of assigning a reference value to each coil based on its voltage potential with respect to the AC voltage in the coils, and developing a map of the coil voltage stress between the coils within each slot for determining the voltage stress or condition between overlapping coils.

2. The process of claim 1 including the step of establishing at least one additional winding configuration different than said first winding configuration to produce said magnetic field, and completing said steps of claim 1 for said at least one additional winding configuration and comparing the maps for the said first winding configuration and said at least one additional winding configuration, and thereby determining the differences in stress values for the different coil configurations.

3. The process of claim 2, wherein said coils extend axially from said slotted core and have overlapping end turns, and said voltage stresses arising in said overlapping end turns, including selecting the optimal configuration of the slot locations and AC voltage connections based on a predetermined stress value criteria.

4. The process of claim 2 wherein said overlapping coils include coil sides in shared slots and said map include the voltage stress within said shared slots.

5. The process of claim 2 further comprising the step of selecting of the coil configuration including a minimum stress value.

6. The process of claim 2 wherein said winding coils of each of said winding configurations form a multiple phase winding with a stress transition area between overlapping coils of different phases, and comprising the step of selecting the winding configuration with the minimum voltage stress within transition areas of the multiple phase winding.

7. Method of selecting a winding configuration for a polyphase dynamoelectric machine stator having, at least two different available winding configurations, each of said configurations establishing a corresponding spaced magnetic poles and including a plurality of phase windings which are circumferentially spaced from each other within slots of an annular stator phase winding having at least a north pole coil unit and a south pole coil unit with said coils connected in series, and said phase windings having overlapping coils, comprising the steps of:

first analyzing a first winding configuration including the steps of assigning a voltage value to each coil in accordance with and related to the voltage appearing across said coil with respect to the reference voltage, comparing the relative voltage value between the overlapping phase coils for each phase relative to all other phases, assigning a relative voltage stress value for each phase coil at each slot with respect to overlapping coils for all said other phase coils;

second analyzing at least a second winding configuration by repeating the analysis of each coil in second winding configuration in the same sequence of the analysis of the first winding configuration; and comparing the voltage stress values at the stator slots in the two winding configurations and selecting an optimum winding configuration based on selected voltage stress criteria.

8. The method of claim 7, including establishing a voltage stress table for the voltage stress at all slots in accordance with the relative voltage stress values for each configuration, said comparing of the voltage stress values being completed by comparison of the voltage stress tables for the two configurations.

9. The method of claim 8 identifying winding transition regions in said table, and comparing the voltage stress values in the transition regions of said coils.

10. The method of claim 7 wherein said winding is a three phase winding wherein each phase winding includes a first coil unit including at least first and second concentric coils connected in series and a second coil unit consisting of at least one coil connected in series with said concentric coils of said first coil level, said three phase winding being connected to a voltage supply in a wye circuit configuration and with the winding terminals connected to the circuit terminals in accordance with industry conventions with respect to the interconnected terminals and the current direction in said coils.

11. The method of claim 7 wherein said phase windings are concentric windings and wherein said overlapping coils including overlapping end turns, and said voltage stress values in said end turns determine the selected configuration.

12. The method of claim 7 wherein said phase windings are lap windings and said coil stator includes shared slots with at least different coil sides wound in each shared slot and said voltage stress values in said shared slots determine the selected configuration.

13. An apparatus for determining optimal coil insertion in rotating electrical machines having at least two multiple coil windings connected to an AC input voltage and each winding having coils distributed within circumferentially distributed slots of an electromagnetic core, said coils having overlapping portions with different connection to said AC voltage input, comprising means for displaying the coil distribution within the core slots, means for displaying the voltage circuit connections between the coils and the AC voltage input to the winding, means for assigning relative voltage potential to said coils in accordance with the input voltage connection, and means for comparing the relative voltage potential distribution between said coils.

14. The apparatus of claim 13 wherein said winding includes overlapping end portions within which voltage stresses arise from said voltage potential distribution, said means for comparing including identification of transition regions within said overlapping end portions.

15. The apparatus of claim 13 wherein said winding includes coils of differing voltage potential and having coil sides wound in a stator slot resulting in shared voltage stresses arise from said voltage potential distribution, said means for comparing including identification in said common slots.

16. The apparatus of claim 14 or 15 wherein said means includes relative numerical values identifying the voltage stresses.

17. The apparatus of claim 14 or 15 wherein said means for displaying includes separate visual presentation units of the stator core slots in a linear array for each coil set of said overlapping windings, the coils of each set being diagrammatically shown in a separate assigned presentation unit, said presentation unit including the voltage connection to each coil set, said presentation units aligned with each other to locate the slots in stacked aligned orientation.

18. The apparatus of claim 14 or 15 wherein said means for displaying includes separate visual presentation units of the stator core slots in a linear array for each coil set of said overlapping windings, the coils of each set being diagrammatically shown in a separate assigned presentation unit, said presentation unit including the voltage connection to each coil set, said presentation units aligned with each other to locate the slots in stacked aligned orientation, and said assigning means assigns the relative voltage potentials appearing on said presentation units.

19. The apparatus of claim 14 or 15 wherein said means for displaying includes separate visual presentation units of the stator core slots in a linear array for each coil set of said overlapping windings, the coils of each set being diagrammatically shown in a separate assigned presentation unit, said presentation unit including the voltage connection to each coil set, said presentation units aligned with each other to locate the slots in stacked aligned orientation, and said assigning means assigns the relative voltage potentials appearing on said presentation units and wherein said comparing means comparing the voltage potentials for each stator coil presentation with each other stator core slot presentation includes a presentation of the stator core slots in columnar aligned relation and includes the relative voltage potential stress in each core slot for each coil set.

20. The apparatus of claim 13 comprising a computing means having programs for said means for displaying the coil distribution within the core slots, for said means for displaying the voltage circuit connections between the coils and the AC input voltage to the winding, for said means for assigning relative voltage potential to said coils in accordance with the input voltage connection, said for said means for comparing the relative voltage potential distribution between said coils, and said computing means further having a program means for comparing coil configurations of said windings and for selecting one of said winding configurations with a predetermined coil configuration based on predetermined criteria.

21. Apparatus for selecting a winding for a polyphase, dynamoelectric machine having at least two available winding configurations, each winding configuration including a plurality of phase windings circumferentially spaced within coil slots in an annular stator and having adjacent overlapping coils of substantially different voltage potentials in at least one of the coil end turns and coil sides in shared slots end turns to the opposite end of the annular stator, each said phase winding having at least one north coil establishing a north pole and at least one south coil establishing a south pole, said coils being connected in series, comprising means for defining the coil distribution within the stator slots including the voltage connections, means for assigning the voltage values for each coil relative to the interconnection of coils to the voltage connections;

means comparing said voltage values and establishing the relative voltage stress between the overlapping coil in said at least one of the coil end turns and the coil sides in shared slots of each coil in each phase relative to all adjacent other coils of the other phase winding, and means for establishing a map of the voltage stress values for selection of the winding configuration having an acceptable voltage stress distribution.

22. The apparatus of claim 21 wherein said map includes a voltage stress table setting forth the voltage stress values in each slot for each winding in comparison to all other windings in each available winding configuration.

23. The apparatus of claim 21 wherein the winding configurations are visually presented in a representation of the stator for each phase winding with the coils located in the slots of the stator, and further comprising the steps of assigning a voltage value on the coil, aligning said representation with the slots aligned, establishing a table of the voltage stress at each slot based on the assigned voltage value, and creating a voltage stress table based on the relative voltage stress in the stator slots and the relative voltage stresses in transition coil slot locations.

24. An apparatus for selecting one of a plurality of non-repeatable motor winding patterns providing a predetermined magnetic pole distribution and different terminal connections for each phase winding of a three phase motor, storing the possible winding configurations equal quantity of the product of the number of available non-repeatable winding patterns times the factorial of half the number of terminal connections raised to the power of the number of phases in the winding, sequentially analyzing each of the configurations including a first configuration by assigning reference values to all coils with said first configuration, calculating the coil to coil relative voltage stress in each said slot, analyzing the overall configuration voltage stress based on the value distribution of the voltage stress throughout the winding, carrying such assigned configuration value in relationship to the last assigned lowest measure to determine whether the voltage stress is larger or smaller than the prior assigned measure or lower than the preceding lowest measured value storing the configuration with the lower value, and proceeding to determine whether another configuration is available, analyzing another available configuration, ending the program with the lowest stress configuration recorded.

25. The apparatus of claim 24 wherein the assigned measure of a configuration voltage stress is determined by assignment of the linear numerical number to the assigned voltage stress levels and reducing the value in response to coil voltage stress values exceeding a predetermined threshold level, selecting the lower value as the more desirable configuration to satisfy the magnetic requirement for the motor.

26. The process of determining placement of overlapping winding coils distributed in a slotted core of a three phase motor for producing a magnetic field with controlled end turn voltage stresses within the end turns of the coils, said overlapping coils extending from the slotted core and located in abutting relation within the end turns and having insulation interposed between the end turns to withstand voltage stresses between the end turn created by the different voltages in the phases, said motor winding comprising circumferentially spaced phase windings with each phase winding including a first coil unit and a second coil unit, each coil unit including a two-set coil including an inner coil wound in first spaced slots and a second coil wound about said inner coil and with the coil sides in adjacent slots and end turn projecting axially out of said core, each phase winding establishes diametrically located magnetic poles, said inner coil having an input terminal in said single coil having a terminal whereby each phase include four terminals and said three phases providing a twelve terminal motor, said windings being connected in a wye circuit connection with a common neutral terminal and three supply terminals, one for each phase, said three phase windings being adapted for placement within said coil in at least two different coil placements and establishing a permutation of 64 different available winding pattern and connection configurations; comprising the following sequence to select a preferred winding configuration, including the steps of first sequentially analyzing at least one of said pattern and connection configurations, and including assigning a relative voltage stress value to each coil of each winding by a separately identifiable reference value, identifying the coil-to- coil voltage stress at each slot throughout the core by adding the assigned voltage stress values to each coil, with such slot, and preparing a map of the coil-to-coil voltage stress for the first and second phases, the first and third phases and the second and third phases, said map identifying the relative voltage stress between said phase coils in the end turn region of the winding, noting the voltage stress in areas of coil transition in the overall stress distribution, providing a similar sequence analysis of one or more of at least one other winding distribution from said analysis of said configurations selecting the winding distribution providing a preferred voltage stress map.

27. The process of determining the voltage stresses in multiple phase motor windings wherein each phase winding includes a plurality of overlapping winding coils distributed within a slotted core and defining a first winding configuration with AC voltage terminals, said coil distribution within the slots producing the necessary magnetic field for operation of the motor, said coils of each phase wound with coil sides in at least a first plurality of shared slots and with the coil sides of different phases in at least a second plurality of shared slots different than said first plurality of shared slots, comprising the steps of assigning a reference value to each coil based on its voltage potential with respect to the AC voltage in the coils, and developing a map of the coil voltage stress between the coils within each shared slot for determining the voltage stress condition between said overlapping coils in said shared slots.

28. The process of claim 27 including the step of establishing at least one additional winding configuration different than said first winding configuration to produce said magnetic field, and completing said steps for said at least one additional winding configuration, and comparing the maps for the said first winding configuration and said at least one additional winding configuration, and thereby determining the differences in stress values for the different winding configurations.

29. The process of claim 28 wherein at least some of said coils of different phases in each of said winding configurations are wound in shared slots of said core, and said voltage stresses arise in said shared slots, and said process further comprising the step of selecting the optimal winding configuration based on a predetermined stress value criteria within said shared slots of said winding configurations.

30. A method of analyzing a motor winding for a dynamoelectric machine including a plurality of phase winding having coil units arranged defining north and south pole of an electromagnetic field, comprising a first sequence including determining the number of non-repeatable unique winding patterns (N) and the number of winding segments (S) to produce the magnetomotive forces from each coil unit when energized at a predetermined level and polarity of current, determining the number of unique relative voltage stress descriptors for all winding segments, and determining the number of instances of each relative voltage stress descriptor occurring in the defined winding segments, and calculating the winding permutations per phase winding by the following equation $$N \cdot \frac{S!}{(\Lambda!)^k}$$

where S is equal to the winding segments per phase, $\Lambda$ is equal to the number of instances of each relative voltage stress descriptor, and k is the number of unique relative voltage stress descriptors;

assigning a relatives voltage stress value to each coil of each coil unit for each of said permutations;

describe the slot locations for all coil sides and the resulting end turn locations and thereby describing the physical relationship of each coil unit and each other coil unit and to each coil to every other coil;

repeat the above sequence for all phases, calculate the number of total permutations and selecting a first permutation, and establishing a second sequence beginning with the selected first permutation, calculating the relative voltage stress value the coil-to-coil end turn voltage stress value and intraslot voltage stress value relationship at each slot position throughout all of said slots for the selected permutation, assign a stress merit measure in accordance with a predetermined voltage stress criteria and for selecting the winding configuration with the desired merit evaluation;

comparing the last assigned measure with any previous measure and save the permutation if better than the previous one; determining if this is the last permutation and recycle to analyze all permutations to the last permutation and then end the program.

31. The method of claim 30 wherein each winding configuration permutation receives an identifying numerical value based on a reference value, establishing said numerical value for a particular winding permutation by assigning penalty points in response to the determination of relative voltage stress values which exceed a predetermined threshold relative to said reference value.

32. The method of claim 30 including graphically displaying the end turn and intraslot voltage stress conditions of permutations.

33. The method of claim 32 wherein said graphical displaying includes a lined drawing of the change in the voltage stress values in the End turn regions of said winding, and the intraslot stress is identified by a separate graphic display at each shared slot.

* * * * *